United States Patent
Usukura et al.

(10) Patent No.: US 8,373,825 B2
(45) Date of Patent: Feb. 12, 2013

(54) DISPLAY DEVICE

(75) Inventors: Naru Usukura, Osaka (JP); Hiromi Katoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/499,159

(22) PCT Filed: Nov. 30, 2010

(86) PCT No.: PCT/JP2010/071319
§ 371 (c)(1), (2), (4) Date: Mar. 29, 2012

(87) PCT Pub. No.: WO2011/065555
PCT Pub. Date: Jun. 3, 2011

(65) Prior Publication Data
US 2012/0188207 A1    Jul. 26, 2012

(30) Foreign Application Priority Data
Nov. 30, 2009 (JP) ................................. 2009-272646

(51) Int. Cl.
*G02F 1/133* (2006.01)
(52) U.S. Cl. ................ 349/72; 349/61; 349/68; 349/69; 349/73; 349/74
(58) Field of Classification Search ..................... 349/56, 349/61, 68, 69, 72, 73, 74
See application file for complete search history.

(56) References Cited

U.S. PATENT DOCUMENTS

| | | | |
|---|---|---|---|
| 6,144,366 A | 11/2000 | Numazaki et al. | |
| 6,784,411 B2* | 8/2004 | Zhang et al. | 250/208.1 |
| 8,203,638 B2* | 6/2012 | Parks et al. | 348/296 |
| 2006/0103637 A1 | 5/2006 | Yamaguchi et al. | |
| 2007/0120833 A1 | 5/2007 | Yamaguchi et al. | |
| 2011/0081520 A1 | 4/2011 | Nojiri et al. | |

FOREIGN PATENT DOCUMENTS

| | | |
|---|---|---|
| JP | 3521187 B2 | 2/2004 |
| JP | 2007-128497 A | 5/2007 |
| JP | 4072732 B2 | 2/2008 |
| JP | 2009-223542 A | 10/2009 |

OTHER PUBLICATIONS

International Search Report.

* cited by examiner

*Primary Examiner* — Jennifer Doan
(74) *Attorney, Agent, or Firm* — Harness, Dickey & Pierce, P.L.C.

(57) ABSTRACT

To provide a display device having an input function that is not dependent on the light environment, multiple sensor pixel circuits that detect light in a specified detection period and hold the light amount when not in the specified detection period are disposed in a pixel region. In a frame in which input is performed using the sensor pixel circuits, a backlight is lit one time for a time in a frame period, and a first detection period and a second detection period are set one time each in the frame period. The difference between the light amount in the first detection period and the light amount in the second detection period is obtained using a difference circuit. The backlight is in an extinguished state at the beginning of the first detection period, and lighting of the backlight is started at a time during the first detection period.

11 Claims, 24 Drawing Sheets

DISPLAY DEVICE

TECHNICAL FIELD

The present invention relates to a display device, and in particular relates to a display device in which multiple photosensors are disposed in a pixel region.

BACKGROUND ART

There is a conventionally known method of providing a display device with an input function using a touch panel, pen input, a scanner, or the like by providing multiple photosensors in a display panel. In order for this method to be applied to mobile devices used in various light environments, the influence of the light environment needs to be eliminated. In view of this, there is also known to be a method in which the component of a signal detected by a photosensor that is dependent on the light environment is removed from the signal so as to obtain the signal that was originally intended to be input.

Japanese Patent No. 4072732 discloses an input/output device in which a photoreception element is provided in correspondence with each display element, a backlight is blinked one time in a frame period, and resetting and readout are performed with respect to the photoreception elements in a line-sequential manner such that the light amount in the backlight lit period and the light amount in the backlight extinguished period in the frame period are acquired from all of the photoreception elements.

FIG. 24 is a diagram showing the timing of lighting and extinguishing of the backlight disclosed in Japanese Patent No. 4072732 and the timing of resetting and readout with respect to the photoreception elements. As shown in FIG. 24, the backlight is lit in the former half of a frame period and extinguished in the latter half. In the backlight lit period, resetting of the photoreception elements is performed in a line-sequential manner (solid line arrow), and thereafter readout from the photoreception elements is performed in a line-sequential manner (broken line arrow). In the backlight extinguished period as well, resetting and readout with respect to the photoreception elements are performed in a similar manner.

Japanese Patent No. 3521187 discloses a solid-state imaging device that includes the unit photoreception portion shown in FIG. 25. The unit photoreception portion shown in FIG. 25 includes one photoelectric conversion portion PD and two charge storage portions C1 and C2. When both external light and light from a light emitting means that has been reflected by an object are received, a first sample gate SG1 is turned on, and charge generated in the photoelectric conversion portion PD is stored in the first charge storage portion C1. When only external light is received, a second sample gate SG2 is turned on, and charge generated in the photoelectric conversion portion PD is stored in the second charge storage portion C2. The amount of light from the light emitting means that was reflected by the object can be obtained by obtaining the difference between the amounts of charge stored in the charge storage portions C1 and C2.

DISCLOSURE OF INVENTION

In general, with a display device in which multiple photosensors are provided in a display panel, readout from the photosensors is performed in a line-sequential manner. Also, a backlight for a mobile device is lit simultaneously in all portions of the screen, and extinguished simultaneously in all portions of the screen.

In the input/output device disclosed in Japanese Patent No. 4072732, the backlight is blinked one time in a frame period, resetting and readout are performed in non-overlapping periods in the backlight lit period, and resetting and readout are performed in non-overlapping periods in the backlight extinguished period as well. For this reason, readout from the photoreception elements needs to be performed within ¼ of the frame period (e.g., within 1/240 sec when the frame rate is 60 frames/sec). However, performing such high-speed readout is very difficult in reality.

Also, there is a ½ frame period deviation between the period in which the photoreception elements detect light in the backlight lit period (B1 shown in FIG. 24) and the period in which the photoreception elements detect light in the backlight extinguished period (B2 shown in FIG. 24). For this reason, the tracking characteristics with respect to motion input fluctuate according to the direction of the motion. Also, in this input/output device, readout is started immediately after the completion of resetting, and resetting is started immediately after the completion of readout. For this reason, it is not possible to freely determine the lengths of and interval between the backlight lit period and the backlight extinguished period.

In view of this, the present invention resolves the aforementioned problems, and an object of the present invention is to provide a display device having an input function that is not dependent on the light environment.

In order to achieve the above-described object, the display device disclosed here is a display device in which a plurality of photosensors are disposed in a display region, including: a display panel including a plurality of display pixel circuits and a plurality of sensor pixel circuits; a sensor signal processing circuit that processes output from the sensor pixel circuits; a light source provided on a back face of the display panel; a light shielding film provided between the sensor pixel circuits and the light source; a light source control unit that provides a period in which the light source is lit and a period in which the light source is extinguished in one frame period in a case where input is performed by the photosensors; a driving circuit that outputs, to the sensor pixel circuits, a first control signal that indicates a first detection period including the period in which the light source is lit and a second control signal that indicates a second detection period not including the period in which the light source is lit, and performs resetting and readout with respect to the sensor pixel circuits; and a difference circuit that obtains a difference between output from the sensor pixel circuits that is based on charge stored in accordance with incident light in the first detection period and output from the sensor pixel circuits that is based on charge stored in accordance with incident light in the second detection period. The length of the first detection period and the length of the second detection period are equivalent, the light source is extinguished at the beginning of the first detection period, and the light source is lit at a time during the first detection period.

According to the above configuration, the difference circuit obtains the difference between output from sensor pixel circuits that is based on the charge stored according to incident light in the first detection period that includes a period in which the light source is lit and output from sensor pixel circuits that is based on the charge stored according to incident light in the second detection period that does not include a period in which the light source is lit. This enables providing an input function that is not dependent on the light environment.

DESCRIPTION OF THE INVENTION

Figure 1:
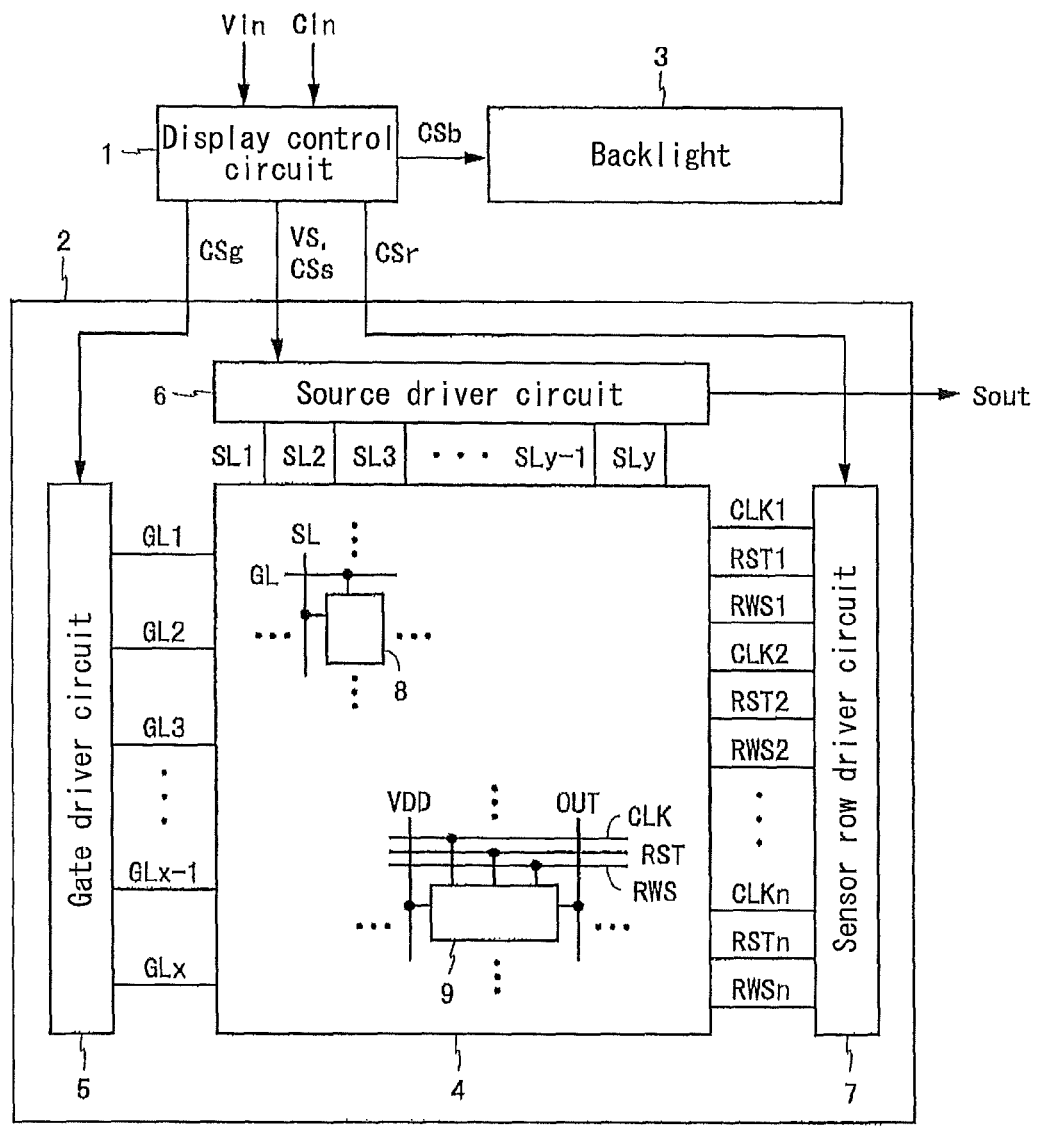
FIG. 1 is a block diagram showing a configuration of a display device according to embodiments of the present invention.

In order to achieve the above-described object, a first configuration according to an embodiment of the present invention is a display device in which a plurality of photosensors are disposed in a display region, including: a display panel including a plurality of display pixel circuits and a plurality of sensor pixel circuits; a sensor signal processing circuit that processes output from the sensor pixel circuits; a light source provided on a back face of the display panel; a light shielding film provided between the sensor pixel circuits and the light source; a light source control unit that provides a period in which the light source is lit and a period in which the light source is extinguished in one frame period in a case where input is performed by the photosensors; a driving circuit that outputs, to the sensor pixel circuits, a first control signal that indicates a first detection period including the period in which the light source is lit and a second control signal that indicates a second detection period not including the period in which the light source is lit, and performs resetting and readout with respect to the sensor pixel circuits; and a difference circuit that obtains a difference between output from the sensor pixel circuits that is based on charge stored in accordance with incident light in the first detection period and output from the sensor pixel circuits that is based on charge stored in accordance with incident light in the second detection period. Note that the length of the first detection period and the length of the second detection period are equivalent, the light source is extinguished at the beginning of the first detection period, and the light source is lit at a time during the first detection period.

According to the first configuration, the difference circuit obtains the difference between output from sensor pixel circuits that is based on charge stored in accordance with incident light in the first detection period including the period in which the light source is lit and output from sensor pixel circuits that is based on charge stored in accordance with incident light in the second detection period not including the period in which the light source is lit. This enables providing an input function that is not dependent on the light environment. Also, in the first configuration, input precision is improved by providing the light shielding film between the sensor pixel circuits and the light source. In other words, the light shielding film prevents direct light from the light source from being incident on the sensor pixel circuits, thus enabling more precisely detecting a change in brightness when an object has touched or come close to the surface of the display panel. Also, in the case of performing input using the photosensors, lighting the light source in a later stage of the first detection period also has an advantage of enabling an improvement in the linearity of sensor output. Specifically, as described above, in the case of providing the light shielding film in the vicinity of the sensor pixel circuits, there are cases of an event in which the linearity of sensor output degrades due to the occurrence of capacitive coupling between the sensor pixel circuits and the light shielding film. In response to this, in the first configuration, the light source is extinguished at the beginning of the first detection period, and the light source is lit at a time during the first detection period. Accordingly, before starting brightness detection while the light source is lit in the first detection period, detection by the sensors starts while the light source is extinguished, thus enabling securing time for mitigating the influence of capacitive coupling immediately after resetting. As a result, the influence of capacitive coupling between the light shielding film and the sensor pixel circuits can be mitigated, and sensor output with high linearity can be obtained.

In the first configuration, it is preferable that included among the sensor pixel circuits are a first sensor pixel circuit to which the first control signal is applied and a second sensor pixel circuit to which the second control signal is applied, and the driving circuit performs readout from the first and second sensor pixel circuits in a line-sequential manner when in neither the first detection period nor the second detection period (second configuration).

In this way, in comparison with the case of sequentially detecting two types of light amounts using one sensor pixel circuit, providing the first sensor pixel circuit and the second sensor pixel circuit separately enables reducing the number of times readout from sensor pixel circuits is performed, and reducing the power consumption of the device by lowering the readout speed. Also, by performing readout from the sensor pixel circuits when not in a detection period, it is possible to more freely determine the timing of lighting and extinguishing of the light source and the timing of resetting and readout performed with respect to the sensor pixel circuits.

In the second configuration, it is preferable that the light source is lit one time for a predetermined time in one frame period, and the first detection period and the second detection period are set one time each in one frame period (third configuration).

Also, in the second configuration, if the first detection period is set immediately after the second detection period, it is possible to eliminate deviation between the two types of detection periods, thus preventing the following characteristics with respect to motion input from fluctuating according to the input direction. Also, in this case, even when using a light source that takes more time to be lit than to be extinguished, it is possible to raise the detection precision by lighting the light source in the entirety of the first detection period. Alternatively, in the second configuration, even if the second detection period is set immediately after the first detection period, it is possible to eliminate deviation between the two types of detection periods, thus preventing the following characteristics with respect to motion input from fluctuating according to the input direction. Also, in this case, it is possible to suppress detection errors that occur due to light leakage in the switching elements included in the sensor pixel circuits.

In the third configuration, it is preferable that the driving circuit performs resetting of the first sensor pixel circuit at the beginning of the first detection period, and performs resetting of the second sensor pixel circuit at the beginning of the second detection period (fourth configuration).

According to the fourth configuration, performing resetting of the sensor pixel circuits at the beginning of the respective detection periods enables accurately detecting the light amounts in the sensor pixel circuits. Also, performing resetting of the same type of sensor pixel circuits all at once enables the same type of sensor pixel circuits to detect light in the same period. This also enables reducing the time needed for resetting and achieving more freedom when determining the readout timing.

In the second configuration, it is preferable that the display panel further includes a plurality of output lines that carry output signals of the first and second sensor pixel circuits, the first and second sensor pixel circuits are connected to different output lines according to type, and the driving circuit performs readout from the first and second sensor pixel circuits in parallel (fifth configuration).

According to the fifth configuration, the first and second sensor pixel circuits are connected to different output lines according to type, and readout from the two types of sensor pixel circuits is performed in parallel, thus enabling reducing the power consumption of the device by lowering the readout speed. Also, if the two types of light amounts are read out in parallel, and the difference therebetween is obtained immediately, there is no need for a memory for storing a previously detected light amount, which is necessary in the case of sequentially detecting two types of light amounts.

In the second configuration, it is preferable that the first and second sensor pixel circuits each include: one photosensor; one storage node that stores charge corresponding to a detected light amount; a readout transistor that has a control terminal capable of electrical connection to the storage node; and a switching element for holding that is provided on a path of current that flows in the photosensor, and is turned on/off in accordance with a control signal that is applied, and the switching element for holding included in the first sensor pixel circuit is turned on in the first detection period in accordance with the first control signal, and the switching element for holding included in the second sensor pixel circuit is turned on in the second detection period in accordance with the second control signal (sixth configuration).

In the sixth configuration, it is preferable that in the first and second sensor pixel circuits, the switching element for holding is provided between the storage node and one end of the photosensor, and another end of the photosensor is connected to a reset line (seventh configuration).

In the sixth configuration, it is preferable that included in the first and second sensor pixel circuits as the switching element for holding are: a first switching element for holding that is provided between the storage node and one end of the photosensor; and a second switching element for holding that is provided between a reset line and another end of the photosensor (eighth configuration). According to this configuration, the second switching element for holding provided between the photosensor and the reset line is turned off when not in a detection period. For this reason, there is a reduction in fluctuation of the potential of the terminal of the photosensor on the first switching element for holding side caused by the current flowing through the photosensor, and there is a reduction in the difference between the potentials applied to the respective ends of the first switching element for holding. This reduces leakage current that flows through the first switching element for holding, thus enabling improving the detection precision by preventing fluctuation in the potential of the storage node.

In the seventh configuration, it is preferable that one photosensor is shared between the two types of first and second sensor pixel circuits, and one end of the shared photosensor is connected to one end of the switching element for holding included in each of the first and second sensor pixel circuits, and another end of the shared photosensor is connected to the reset line (ninth configuration).

In the eighth configuration, it is preferable that one photosensor is shared between the two types of first and second sensor pixel circuits, and one end of the shared photosensor is connected to one end of the first switching element for holding included in each of the first and second sensor pixel circuits, and another end of the shared photosensor is connected to one end of the second switching element for holding included in each of the first and second sensor pixel circuits (tenth configuration).

According to the ninth or tenth configurations, one photosensor is shared between the two types of sensor pixel circuits, thus enabling accurately obtaining the difference between the light amount in the first detection period and the light amount in the second detection period by canceling out the influence of variation in the sensitivity characteristics of the photosensor. Also, the number of photosensors is reduced, thus enabling raising the sensitivity of the sensor pixel circuits by raising the aperture ratio.

In the ninth configuration, it is preferable that one readout transistor is shared between the two types of first and second sensor pixel circuits, and the control terminal of the shared readout transistor is connected to one end of the shared photosensor and to one end of the switching element for holding included in each of the first and second sensor pixel circuits (eleventh configuration).

According to the eleventh configuration, one readout transistor is shared between the two types of sensor pixel circuits, thus enabling accurately obtaining the difference between the light amount in the first detection period and the light amount in the second detection period by canceling out the influence of variation in the threshold value characteristics of the readout transistor.

EMBODIMENTS

More specific embodiments of the present invention will be described below with reference to the drawings.

FIG. 1 is a block diagram showing the configuration of a display device according to embodiments of the present invention. The display device shown in FIG. 1 includes a display control circuit 1, a display panel 2, and a backlight 3. The display panel 2 includes a pixel region 4, a gate driver circuit 5, a source driver circuit 6, and a sensor row driver circuit 7. The pixel region 4 includes multiple display pixel circuits 8 and multiple sensor pixel circuits 9. This display device has a function of displaying images on the display panel 2 and a function of detecting light that was incident on the display panel 2. Hereinafter, it is assumed that x is an integer greater than or equal to 2, y is a multiple of 3, and m and n are even numbers, and that the frame rate of the display device is 60 frames/sec.

A video signal Vin and a timing control signal Cin are supplied from the outside to the display device shown in FIG. 1. Based on these signals, the display control circuit 1 outputs a video signal VS and control signals CSg, CSs, and CSr to the display panel 2, and outputs a control signal CSb to the backlight 3. The video signal VS may be the same as the video signal Vin, or may be a signal obtained by carrying out signal processing on the video signal Vin.

The backlight 3 is a light source that irradiates the display panel 2 with light. More specifically, the backlight 3 is provided on the back face side of the display panel 2, and irradiates the back face of the display panel 2 with light. In the embodiments, the backlight 3 includes a white LED for display and an infrared LED for sensing. The white LED is in the lit state during image display, and is also in the lit state during sensing by the sensor pixel circuits. Note that the white LED may be in the extinguished state during sensing. The infrared LED for sensing is lit when the control signal CSb is at high level, and is extinguished when the control signal CSb is at low level. In the display device of the embodiments, the display of an image on the display panel 2 and input (sensing) by the sensor pixel circuits 9 are performed in the same frame. Note that image display and sensing need only be executed in a synchronized manner, and do not necessarily need to be executed at the same cycle. For example, a configuration is possible in which sensing is performed at 120 Hz, and display is performed at 60 Hz. With regards to sensing in the embodiments, the control signal CSb is switched between the high level and the low level at least one time in a frame period, and thus a period in which the infrared LED of the backlight 3 is lit and a period in which it is extinguished are provided in the frame period.

In the pixel region 4 of the display panel 2, (x×y) display pixel circuits 8 and (n×m/2) sensor pixel circuits 9 are arranged two-dimensionally. More specifically, x gate lines GL1 to GLx and y source lines SL1 to SLy are provided in the pixel region 4. The gate lines GL1 to GLx are arranged parallel with each other, and the source lines SL1 to SLy are arranged parallel with each other so as to intersect the gate lines GL1 to GLx. The (x×y) display pixel circuits 8 are arranged in the vicinity of the intersections between the gate lines GL1 to GLx and the source lines SL1 to SLy. Each of the display pixel circuits 8 is connected to one gate line GL and one source line SL. The display pixel circuits 8 are divided into those for red display, those for green display, and those for blue display. These three types of display pixel circuits 8 are arranged aligned in the extending direction of the gate lines GL1 to GLx and constitute one color pixel.

In the pixel region 4, n clock lines CLK1 to CLKn, n reset lines RST1 to RSTn, and n readout lines RWS1 to RWSn are provided parallel with the gate lines GL1 to GLx. Also, other signal lines and power supply lines (not shown) may be provided in parallel with the gate lines GL1 to GLx in the pixel region 4. When readout from the sensor pixel circuits 9 is performed, m lines selected from among the source lines SL1 to SLy are used as power supply lines VDD1 to VDDm, and m other lines among the source lines SL1 to SLy are used as output lines OUT1 to OUTm.

Figure 2:
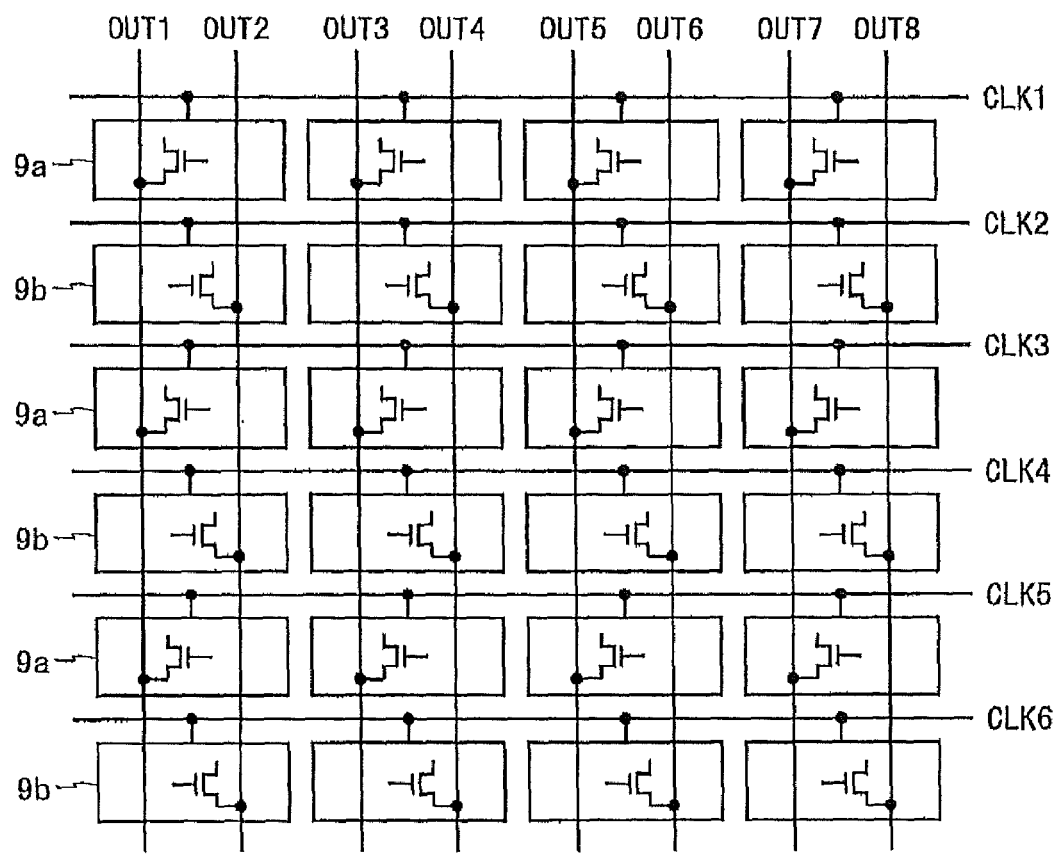
FIG. 2 is a diagram showing the arrangement of sensor pixel circuits in a display panel included in the display device shown in FIG. 1.

FIG. 2 is a diagram showing the arrangement of the sensor pixel circuits 9 in the pixel region 4. Included among the (n×m/2) sensor pixel circuits 9 are first sensor pixel circuits 9a that detect light that was incident in the lit period of the infrared LED of the backlight 3 and second sensor pixel circuits 9b that detect light that was incident in the extinguished period of the infrared LED of the backlight 3. The number of first sensor pixel circuits 9a is the same as the number of second sensor pixel circuits 9b.

In FIG. 2, (n×m/4) first sensor pixel circuits 9a are arranged in the vicinity of intersections between odd-numbered clock lines CLK1 to CLKn−1 and odd-numbered output lines OUT1 to OUTm−1. (n×m/4) second sensor pixel circuits 9b are arranged in the vicinity of intersections between even-numbered clock lines CLK2 to CLKn and even-numbered output lines OUT2 to OUTm. In this way, the display panel 2 includes multiple output lines OUT1 to OUTm for carrying output signals from the first sensor pixel circuits 9a and output signals from the second sensor pixel circuits 9b, and the first sensor pixel circuits 9a and second sensor pixel circuits 9b are connected to different output lines according to type.

Note that the back face of each of the first sensor pixel circuit 9a and second sensor pixel circuit 9b is provided with a light shielding film (not shown in FIG. 2) for preventing direct light from the backlight 3 from being incident on the sensor. This enables more precisely detecting a change in brightness when an object has touched or come close to the surface of the display panel.

The gate driver circuit 5 drives the gate lines GL1 to GLx. More specifically, based on the control signal CSg, the gate driver circuit 5 sequentially selects one gate line from among the gate lines GL1 to GLx, applies a high level potential to the selected gate line, and applies a low level potential to the remaining gate lines. Accordingly, the y display pixel circuits 8 connected to the selected gate line are selected all at once.

The source driver circuit 6 drives the source lines SL1 to SLy. More specifically, based on the control signal CSs, the source driver circuit 6 applies a potential corresponding to the video signal VS to the source lines SL1 to SLy. At this time, the source driver circuit 6 may perform line-sequential driving, or may perform dot-sequential driving. The potential applied to the source lines SL1 to SLy is written to the y display pixel circuits 8 selected by the gate driver circuit 5. In this way, a desired image can be displayed on the display panel 2 by writing potentials corresponding to the video signal VS to all of the display pixel circuits 8 using the gate driver circuit 5 and the source driver circuit 6.

The sensor row driver circuit 7 drives the clock lines CLK1 to CLKn, the reset lines RST1 to RSTn, the readout lines RWS1 to RWSn, and the like. More specifically, in the display device of the embodiments, by controlling the potential of the clock lines CLK1 to CLKn, a detection period including a backlight lit period (first detection period) and a detection period that is as long as the first detection time and does not include a backlight lit period (second detection period) are each set one time in a frame period (described in detail later).

The sensor row driver circuit 7 applies a high level potential to the odd-numbered clock lines CLK1 to CLKn−1 in the first detection period including a backlight lit period, and applies a high level potential to the even-numbered clock lines CLK2 to CLKn in the second detection period not including a backlight lit period. Also, the sensor row driver circuit 7 applies a high level potential to the odd-numbered reset lines RST1 to RSTn−1 at the beginning of the first detection period, and applies a high level potential to the even-numbered reset lines RST2 to RSTn at the beginning of the second detection period. Accordingly, the (n×m/4) sensor pixel circuits 9 connected to the reset line that received application of the high level potential are reset all at once.

Also, based on the control signal CSr, the sensor row driver circuit 7 sequentially selects two adjacent readout lines from among the readout lines RWS1 to RWSn, applies a readout high level potential to the selected readout lines, and applies a low level potential to the remaining readout lines. Accordingly, the m sensor pixel circuits 9 connected to the two selected readout lines enter a readout-possible state all at once. At this time, the source driver circuit 6 applies a high level potential to the power supply lines VDD1 to VDDm. Accordingly, signals that correspond to the amount of light detected by the m sensor pixel circuits 9 in the readout-possible state (hereinafter referred to as "sensor signals") are output from the sensor pixel circuits 9 to the output lines OUT1 to OUTm.

The source driver circuit 6 includes a difference circuit that obtains the difference between the output signal from the first sensor pixel circuits 9a and the output signal from the second sensor pixel circuits 9b. The source driver circuit 6 amplifies the light amount difference obtained by the difference circuit and outputs the amplified signal outside the display panel 2 as sensor output Sout. In this way, light that was incident on the display panel 2 can be detected by reading out sensor signals from all of the sensor pixel circuits 9 using the source driver circuit 6 and the sensor row driver circuit 7. In order to detect light that was incident on the display panel 2 of the display device shown in FIG. 1, the driving described below is performed one time in a frame in which input is performed by the sensor pixel circuits 9.

Figure 3:
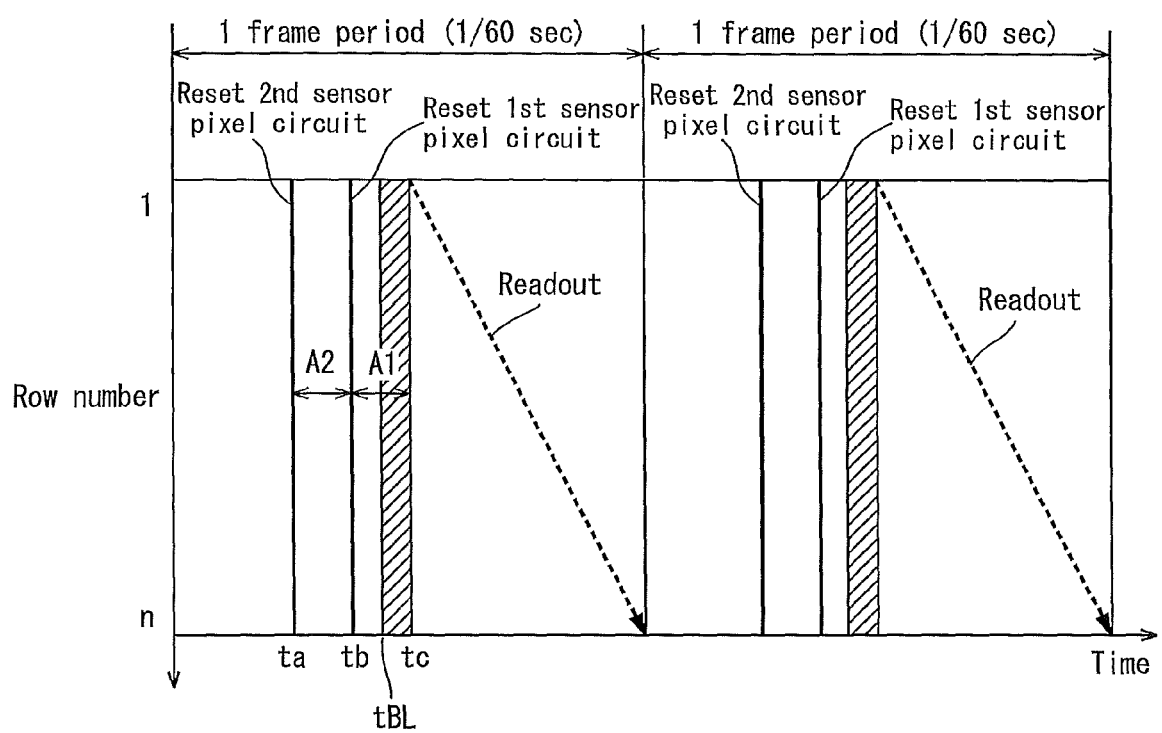
FIG. 3 is a diagram showing the timing of lighting and extinguishing of a backlight and the timing of resetting and readout with respect to sensor pixel circuits in the display device shown in FIG. 1.

FIG. 3 is a diagram showing the timing of lighting and extinguishing of the infrared LED of the backlight 3 and the timing of resetting and readout with respect to the sensor pixel circuits 9 in a frame in which input is performed by the sensor pixel circuits 9. The hatched periods (times tBL to tc) in FIG. 3 are periods in which the infrared LED of the backlight 3 is lit. As shown in FIG. 3, the infrared LED of the backlight 3 is lit one time for a predetermined time in a frame period, and is extinguished in the remainder of the period. More specifically, the infrared LED of the backlight 3 is lit at the time tBL and extinguished at the time tc in a frame period. Also, resetting of all of the first sensor pixel circuits 9a is performed at a time tb, and resetting of all of the second sensor pixel circuits 9b is performed at a time ta.

The first sensor pixel circuits 9a store a charge corresponding to incident light in the first detection period (time tb to time tc) including the lit period of the infrared LED of the backlight 3 (time tBL to time tc shown in FIG. 3). The first detection period is shown as "A1" in FIG. 3. Although described in detail later, the first detection period is a period in which the clock lines CLK connected to the first sensor pixel circuits 9a are held at the high level potential. In other words, the first detection period can be appropriately set by controlling the timing at which and length for which the clock lines CLK connected to the first sensor pixel circuits 9a are held at the high level potential. The second sensor pixel circuits 9b store a charge corresponding to incident light in the second detection period (time ta to time tb) not including a lit period of the infrared LED of the backlight 3. The second detection period is shown as "A2" in FIG. 3. The second detection period is a period in which the clock lines CLK are held at the high level potential. In other words, the second detection period can be appropriately set by controlling the timing at which and length for which the clock lines CLK connected to the second sensor pixel circuits 9b are held at the high level potential. The first detection period and the second detection period have the same length. Note that the lit period of the infrared LED of the backlight 3 starts during a first detection period A1. It is preferable that the lighting of the infrared LED of the backlight 3 continues until the end of the first detection period. Note that there are no particular limitations on the proportion of the first detection period A1 occupied by the lit period of the infrared LED of the backlight 3 (time tBL to time tc).

Readout from the first sensor pixel circuits 9a and readout from the second sensor pixel circuits 9b are performed in parallel and in a line-sequential manner from the time tc onward. Note that although readout from the sensor pixel circuits 9 is completed within a frame period in FIG. 3, this readout needs only be completed before resetting of the first sensor pixel circuits 9a is performed in the next frame period.

Figure 4:
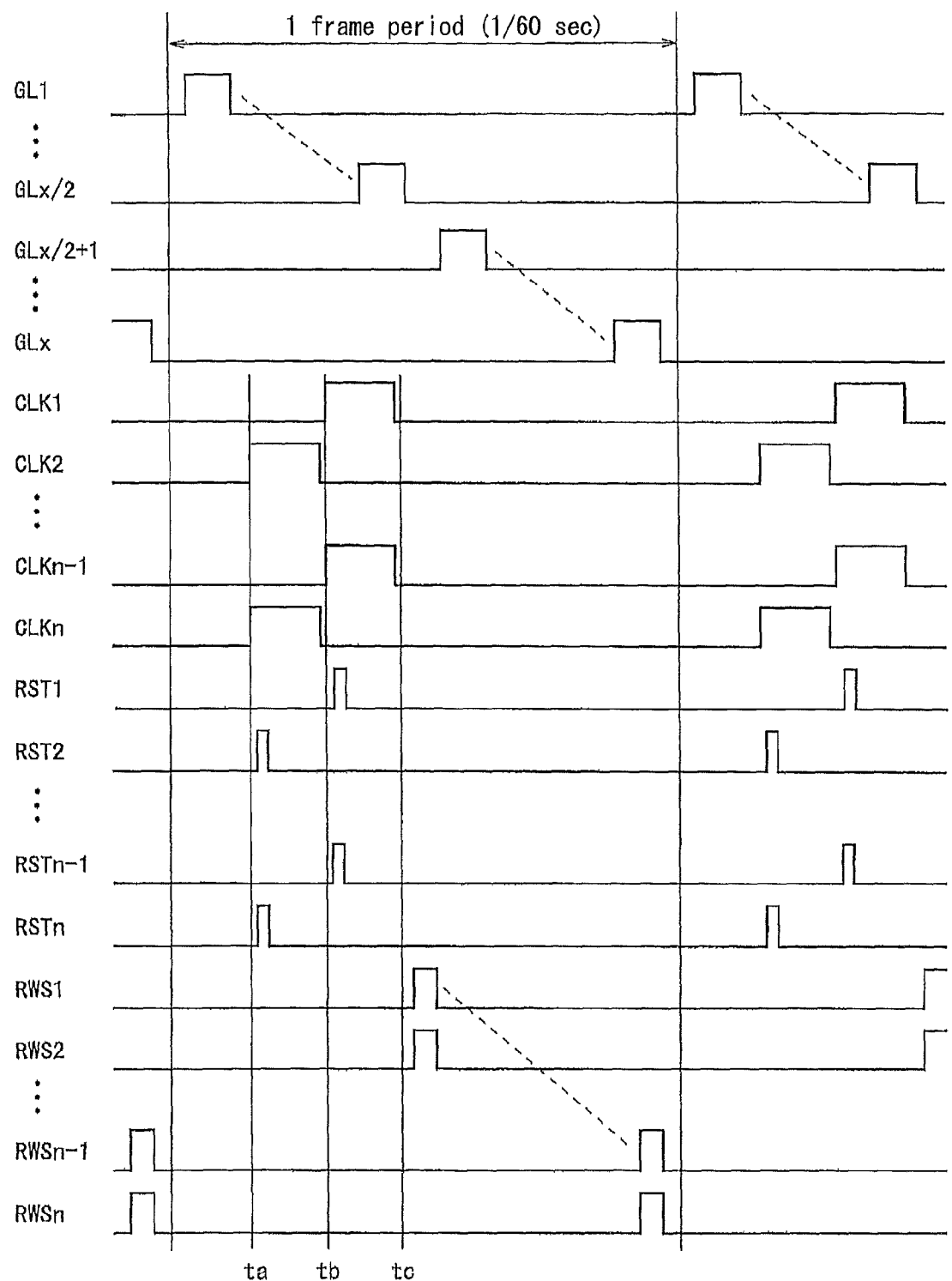
FIG. 4 is a signal waveform diagram of the display panel included in the display device shown in FIG. 1.

FIG. 4 is a signal waveform diagram of the display panel 2. As shown in FIG. 4, the potentials of the gate lines GL1 to GLx sequentially rise to the high level one time each for a predetermined time in a frame period. The potentials of the odd-numbered clock lines CLK1 to CLKn−1 connected to the first sensor pixel circuits 9a rise to the high level one time in a frame period from the time tb that is a little earlier than the time tBL at which the infrared LED of the backlight 3 is lit, until a little before the time tc at which the infrared LED of the backlight 3 is extinguished. The period in which the potential of the odd-numbered clock lines CLK1 to CLKn−1 is at the high level is the aforementioned first detection period A1. The period in which the infrared LED of the backlight 3 is lit (time tBL to time tc) starts during the first detection period A1. The potential of the even-numbered clock lines CLK2 to CLKn rises to high level one time in a frame period, until a little before the time tb. The period in which the potential of the even-numbered clock lines CLK2 to CLKn is at the high level is the aforementioned second detection period A2. The length of the first detection period A1 and the length of the second detection period A2 are the same.

The potential of the odd-numbered reset lines RST1 to RSTn−1 rises to the high level one time in a frame period for a predetermined time at the start of the first detection period A1. The potential of the even-numbered reset lines RST2 to RSTn rises to the high level one time in a frame period for a predetermined time at the start of the second detection period A2. The readout lines RWS1 to RWSn are grouped into pairs of two each, and the potentials of the (n/2) pairs of readout lines sequentially rise to the high level for a predetermined time from the time tc onward.

Figure 5:
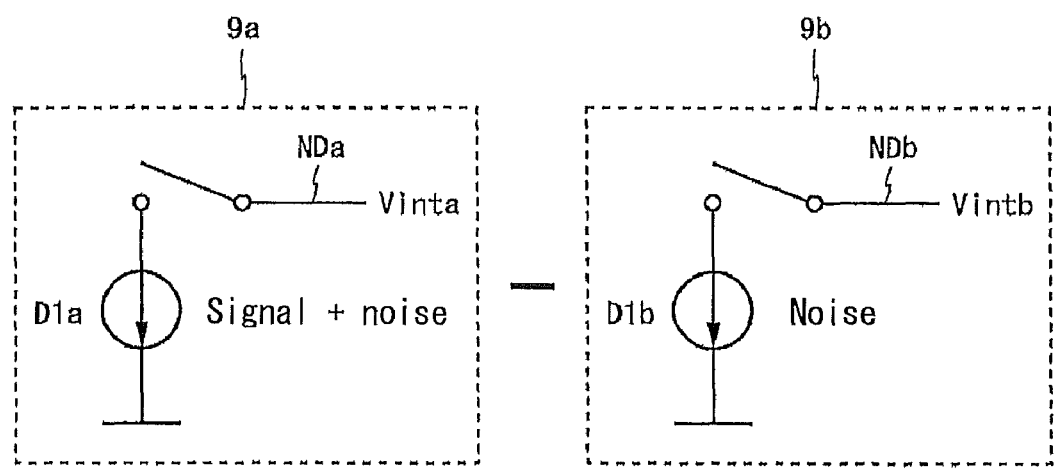
FIG. 5 is a diagram showing schematic configurations of the sensor pixel circuits included in the display device shown in FIG. 1.

FIG. 5 is a diagram showing the schematic configurations of the sensor pixel circuits 9. As shown in FIG. 5, the first sensor pixel circuit 9a includes one photodiode D1a and one storage node NDa. The photodiode D1a draws out, from the storage node NDa, a charge corresponding to the amount of light (signal+noise) that was incident in the first detection period (A1 in FIG. 3). Similarly to the first sensor pixel circuit 9a, the second sensor pixel circuit 9b includes one photodiode D1b and one storage node NDb. The photodiode D1b draws out, from the storage node NDb, a charge corresponding to the amount of light (noise) that was incident in the second detection period (A2 in FIG. 3). The first sensor pixel circuit 9a and the second sensor pixel circuit 9b hold the detected light amount when in neither the first detection period nor the second detection period. A sensor signal corresponding to the amount of light that was incident in the first detection period is read out from the first sensor pixel circuit 9a. A sensor signal corresponding to the amount of light that was incident in the second detection period is read out from the second sensor pixel circuit 9b. Using the difference circuit included in the source driver circuit 6, the difference between the output signal from the first sensor pixel circuit 9a and the output signal from the second sensor pixel circuit 9b is obtained, thus enabling obtaining the difference between the light amount in the first detection period including a backlight lit period and the light amount in the second detection period not including a backlight lit period.

Note that an arbitrary number of sensor pixel circuits 9 may be provided in the pixel region 4. However, it is preferable that the first sensor pixel circuits 9a and the second sensor pixel circuits 9b are connected to different output lines. For example, in the case of providing (n×m) sensor pixel circuits 9 in the pixel region 4, n first sensor pixel circuits 9a are connected to each of the odd-numbered output lines OUT1 to OUTm−1, and n second sensor pixel circuits 9b are connected to each of the even-numbered output lines OUT2 to OUTm. In this case, readout from the sensor pixel circuits 9 is performed row-by-row. Alternatively, the same number of sensor pixel circuits 9 as color pixels (i.e., (x×y/3) sensor pixel circuits 9) may be provided in the pixel region 4. As another alternative, fewer sensor pixel circuits 9 than the number of color pixels (e.g., 1/X the number of color pixels, where X is in the range of 2 to several tens) may be provided in the pixel region 4.

As described above, a display device of embodiments is a display device in which multiple photodiodes (photosensors) are arranged in the pixel region 4, the display device including the display panel 2 in which multiple display pixel circuits 8 and multiple sensor pixel circuits 9 are included, the infrared LED of the backlight 3 that is lit one time for a predetermined time in a frame period, and the sensor row driver circuit 7 (driving circuit) that outputs, to the sensor pixel circuits 9, the odd-numbered clock signals CLK1 to CLKn−1 (first control signals) that indicate the first detection period and the even-numbered clock signals CLK2 to CLKn (second control signals) that indicate the second detection period, and performs resetting and readout with respect to the sensor pixel circuits 9. Each of the sensor pixel circuits 9 includes the first sensor pixel circuits 9a that, in accordance with the odd-numbered clock signals CLK1 to CLKn−1, detect light in the first detection period and hold the detected light amount when not in the first detection period, and the second sensor pixel circuits 9b that, in accordance with the even-numbered clock signals CLK2 to CLKn, detect light in the second detection period, and hold the detected light amount when not in the second detection period. When in neither the first detection period nor the second detection period, the sensor row driver circuit 7 performs readout from the first sensor pixel circuits 9a and readout from the second sensor pixel circuits 9b in a line-sequential manner.

Therefore according to a display device of embodiments, a light amount in the first detection period including a backlight lit period and a light amount in the second detection period not including a backlight lit period are detected separately using two types of sensor pixel circuits, and the difference between the two light amounts can be obtained by the difference circuit. This enables providing an input function that is not dependent on the light environment. Also, compared to the case of sequentially detecting two types of light amounts with one sensor pixel circuit, the number of times readout from a sensor pixel circuit is performed is reduced, and thus the power consumption of the device can be reduced by lowering the readout speed. Also, by performing readout from the sensor pixel circuits when not in a detection period, it is possible to more freely determining the timing of lighting and extinguishing of the backlight and the timing of resetting and readout performed with respect to the sensor pixel circuits.

Also, the sensor row driver circuit 7 performs resetting of the first sensor pixel circuits 9a at the beginning of the first detection period, and performs resetting of the second sensor pixel circuits 9b at the beginning of the second detection period. In this way, performing resetting of the sensor pixel circuits at the beginning of the respective detection periods enables accurately detecting the light amounts in the sensor pixel circuits. Also, performing resetting of the same type of sensor pixel circuits all at once enables the same type of sensor pixel circuits to detect light in the same period. This also enables reducing the time needed for resetting and achieving more freedom when determining the readout timing.

Also, the first detection period is set immediately after the second detection period. In this way, setting the two types of detection periods close to each other enables eliminating deviation between the two types of detection periods, thus preventing the following characteristics with respect to motion input from fluctuating according to the input direction. Also, by setting the first detection period immediately after the second detection period, and furthermore lighting the infrared LED of the backlight 3 at a time during the first detection period, it is possible to raise the detection precision even in the case of using a backlight that takes more time to be lit than to be extinguished. Also, by setting the same length for the first detection period and the second detection period, with respect to periods of the same length, it is possible to accurately obtain the difference between the light amount in the first detection period including a backlight lit period and the light amount in the second detection period not including a backlight lit period.

Also, the display panel 2 further includes multiple output lines OUT1 to OUTm that carry the output signals from the first and second sensor pixel circuits 9a and 9b, the first sensor pixel circuits 9a and the second sensor pixel circuits 9b are connected to different output lines, and the sensor row driver circuit 7 performs readout from the first sensor pixel circuits 9a and readout from the second sensor pixel circuits 9b in parallel. The source driver circuit 6 includes the difference circuit that obtains the difference between the output signals from the first sensor pixel circuits 9a and the output signals from the second sensor pixel circuits 9b. In this way, by connecting the first and second sensor pixel circuits 9a and 9b to different output lines according to type and performing readout from the two types of sensor pixel circuits in parallel, it is possible to reduce the power consumption of the device by lowering the readout speed. Also, providing the difference circuit enables obtaining the difference between the light amount in the first detection period including a backlight lit period and the light amount in the second detection period not including a backlight lit period, and enables eliminating the need for a memory for storing a previously detected light amount.

Furthermore, by lighting the infrared LED of the backlight 3 at a time during the first detection period, it is possible to mitigate the influence of capacitive coupling between the sensor pixel circuits and the light shielding film provided on the back faces thereof, and thus improve the linearity of sensor output. Details of this will be described later.

The following is a specific description of the sensor pixel circuits 9 included in a display device of embodiments. In the following description, the sensor pixel circuits are referred to as pixel circuits, and the signals on signal lines are identified by the same names as those of the signal lines (e.g., the signal on the clock line CLKa is referred to as the clock signal CLKa). In first, second, sixth, and seventh embodiments, the first sensor pixel circuit 9a is connected to a clock line CLKa, a reset line RSTa, a readout line RWSa, a power supply line VDDa, and an output line OUTa. The second sensor pixel circuit 9b is connected to a clock line CLKb, a reset line RSTb, a readout line RWSb, a power supply line VDDb, and an output line OUTb.

In these embodiments, the second sensor pixel circuit 9b and the first sensor pixel circuit 9a have the same configuration and operate in a similar manner, and therefore a description of the second sensor pixel circuit 9b will be omitted when appropriate. In third to fifth embodiments, the first sensor pixel circuit 9a and the second sensor pixel circuit 9b share some constituent elements and are configured as a single sensor pixel circuit. The pixel circuits of the third and fourth embodiments are connected to a common reset line RST and readout line RWS, and the pixel circuits of the fifth embodiment are connected to a common reset line RST, readout line RWS, power supply line VDD, and output line OUT.

First Embodiment

Figure 6:
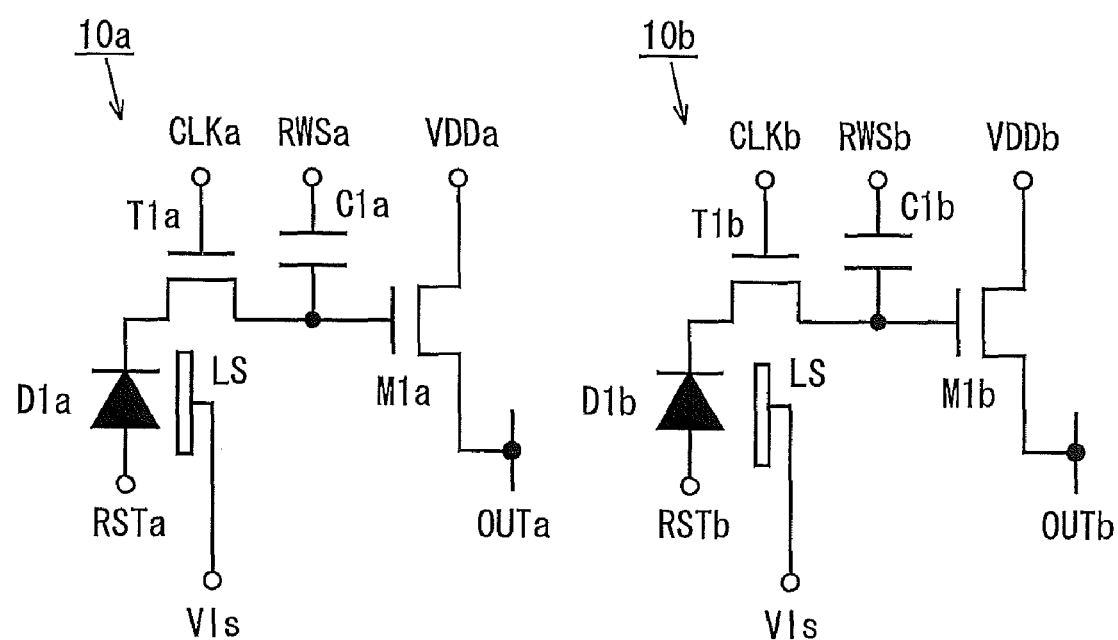
FIG. 6 is a circuit diagram of sensor pixel circuits according to a first embodiment of the present invention.

FIG. 6 is a circuit diagram of pixel circuits according to a first embodiment of the present invention. As shown in FIG. 6, a first pixel circuit 10a includes transistors T1a and M1a, a photodiode D1a, and a capacitor C1a. A second pixel circuit 10b includes transistors T1b and M1b, a photodiode D1b, and a capacitor C1b. The transistors T1a, M1a, T1b, and M1b are each an N-type thin film transistor (TFT). In the present embodiment, the photodiodes D1a and D1b are each a lateral structure PIN diode.

In the first pixel circuit 10a, the anode of the photodiode D1a is connected to the reset line RSTa, and the cathode is connected to the source of the transistor T1a. The gate of the transistor T1a is connected to the clock line CLKa, and the drain is connected to the gate of the transistor M1a. The drain of the transistor M1a is connected to the power supply line VDDa, and the source is connected to the output line OUTa. The capacitor C1a is provided between the gate of the transistor M1a and the readout line RWSa. In the first pixel circuit 10a, the node connected to the gate of the transistor M1a serves as a storage node for storing a charge corresponding to the detected light amount, and the transistor M1a functions as a readout transistor. The second pixel circuit 10b has the same configuration as the first pixel circuit 10a.

The first pixel circuit 10a has a light shielding film LS on the back face (backlight 3 side) of the photodiode D1a. The light shielding film LS is formed from a thin film of a metal such as molybdenum and prevents direct light from the backlight 3 from being incident on the photodiode D1a. The potential of the light shielding film LS is maintained at a constant potential Vls at least during operation of the first pixel circuit 10a. Similarly to the first pixel circuit 10a, the second pixel circuit 10b also includes a light shielding film LS that is maintained at the constant potential Vls at least during operation of the second pixel circuit 10b. Note that although the light shielding film LS is not shown from FIG. 7 onward, the light shielding film LS is provided on the back face (backlight 3 side) of the photodiode in the other embodiments as well.

Figure 7:
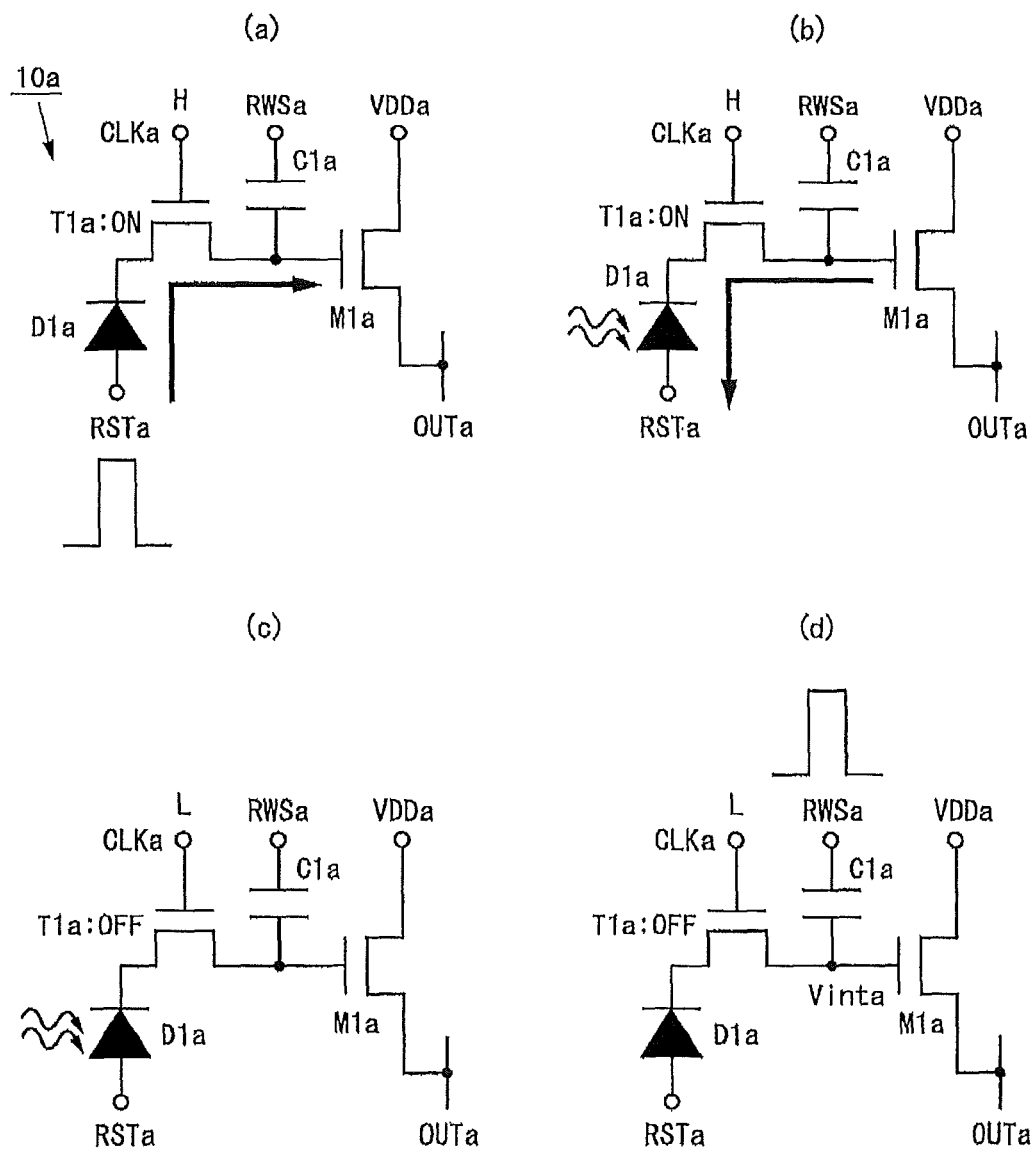
FIG. 7 is a diagram showing operations of the sensor pixel circuits shown in FIG. 6.

FIG. 7 is a diagram showing operations of the first pixel circuit 10a. As shown in FIG. 7, in a frame in which input is performed by the sensor pixel circuits 9, the first pixel circuit 10a performs (a) resetting, (b) storage, (c) holding, and (d) readout in a frame period.

Figure 8:
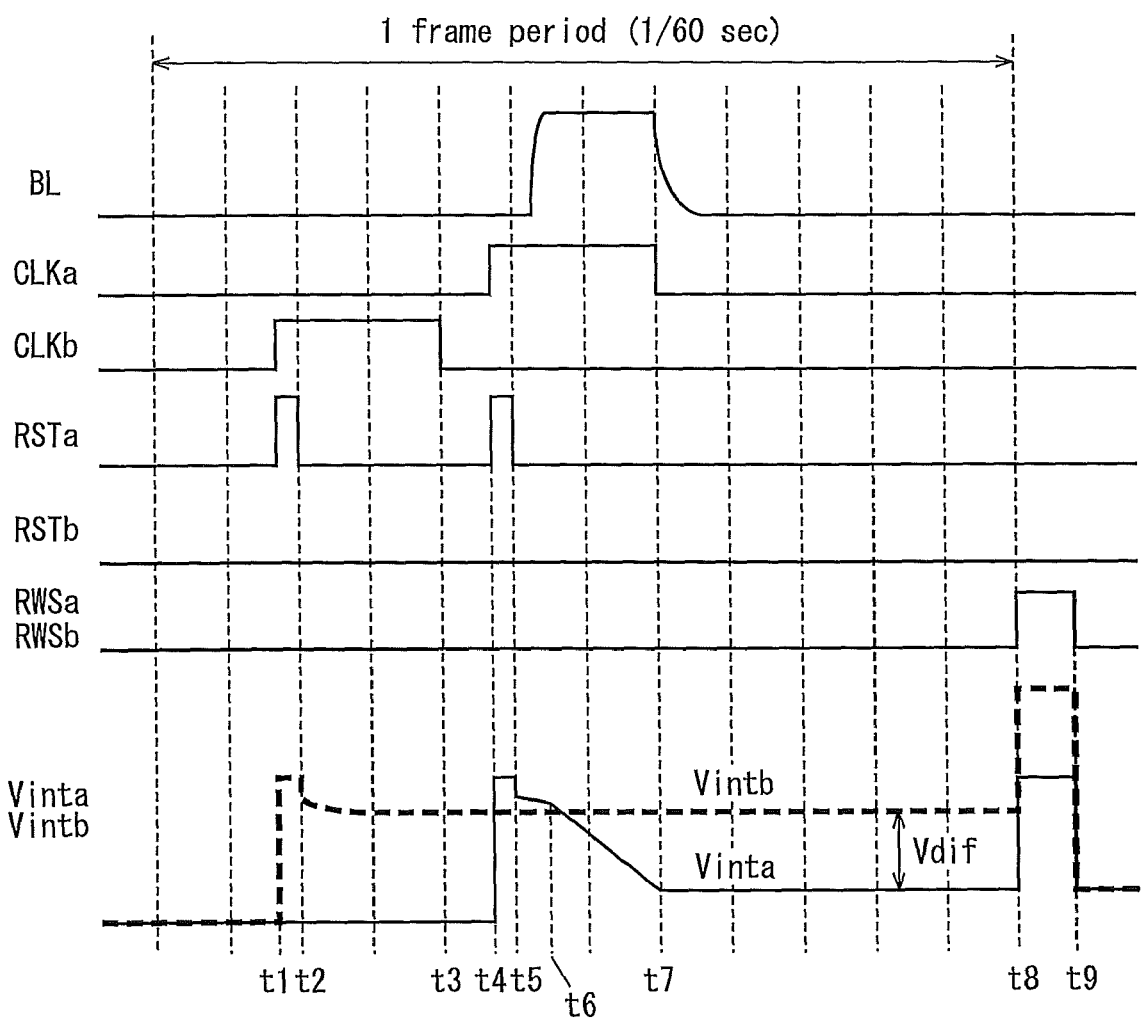
FIG. 8 is a signal waveform diagram of the sensor pixel circuits shown in FIG. 6.

FIG. 8 is a signal waveform diagram of the first pixel circuit 10a and the second pixel circuit 10b. In FIG. 8, BL indicates the luminance of the infrared LED of the backlight 3, Vinta indicates the potential of the storage node of the first pixel circuit 10a (the gate potential of the transistor M1a), and Vintb indicates the potential of the storage node of the second pixel circuit 10b (the gate potential of the transistor M1b). With regards to the first pixel circuit 10a, the reset period is from time t4 to time t5, the storage period is from time t5 to time t7, the holding period is from time t7 to time t8, and the readout period is from time t8 to time t9. Note that from time t6 to time t7 is the period in which the infrared LED of the backlight 3 is lit in the first detection period. With regards to the second pixel circuit 10b, the reset period is from time t1 to time t2, the storage period is from time t2 to time t3, the holding period is from time t3 to time t8, and the readout period is from time t8 to time t9.

In the reset period of the first pixel circuit 10a, the clock signal CLKa rises to the high level, the readout signal RWSa falls to the low level, and the reset signal RSTa rises to the reset high level. At this time, the transistor T1a is turned on. Accordingly, current (forward biased current from the photodiode D1a) flows from the reset line RSTa to the storage node via the photodiode D1a and the transistor T1a ((a) in FIG. 7), and the potential Vinta is reset to a predetermined level.

In the storage period of the first pixel circuit 10a, the clock signal CLKa rises to the high level, and the reset signal RSTa and the readout signal RWSa fall to the low level. At this time, the transistor T1a is turned on. When light is incident on the photodiode D1a at this time, current (photocurrent from the photodiode D1a) flows from the storage node to the reset line RSTa via the transistor T1a and the photodiode D1a, and charge is drawn out from the storage node ((b) in FIG. 7). Accordingly, the potential Vinta drops according to the amount of light that was incident in the period for which the clock signal CLKa was at the high level.

Note that in the present embodiment, the infrared LED of the backlight 3 is lit at the time t6 during the storage period (time t5 to time t7) of the first pixel circuit 10a. In other words, at the beginning of the storage period of the first pixel circuit 10a, the infrared LED of the backlight 3 is in the extinguished state. In this way, the linearity of sensor output can be improved by lighting the infrared LED of the backlight 3 at a time during the storage period of the first pixel circuit 10a. The reason for this will be described below with reference to FIGS. 9 and 10.

Figure 9:
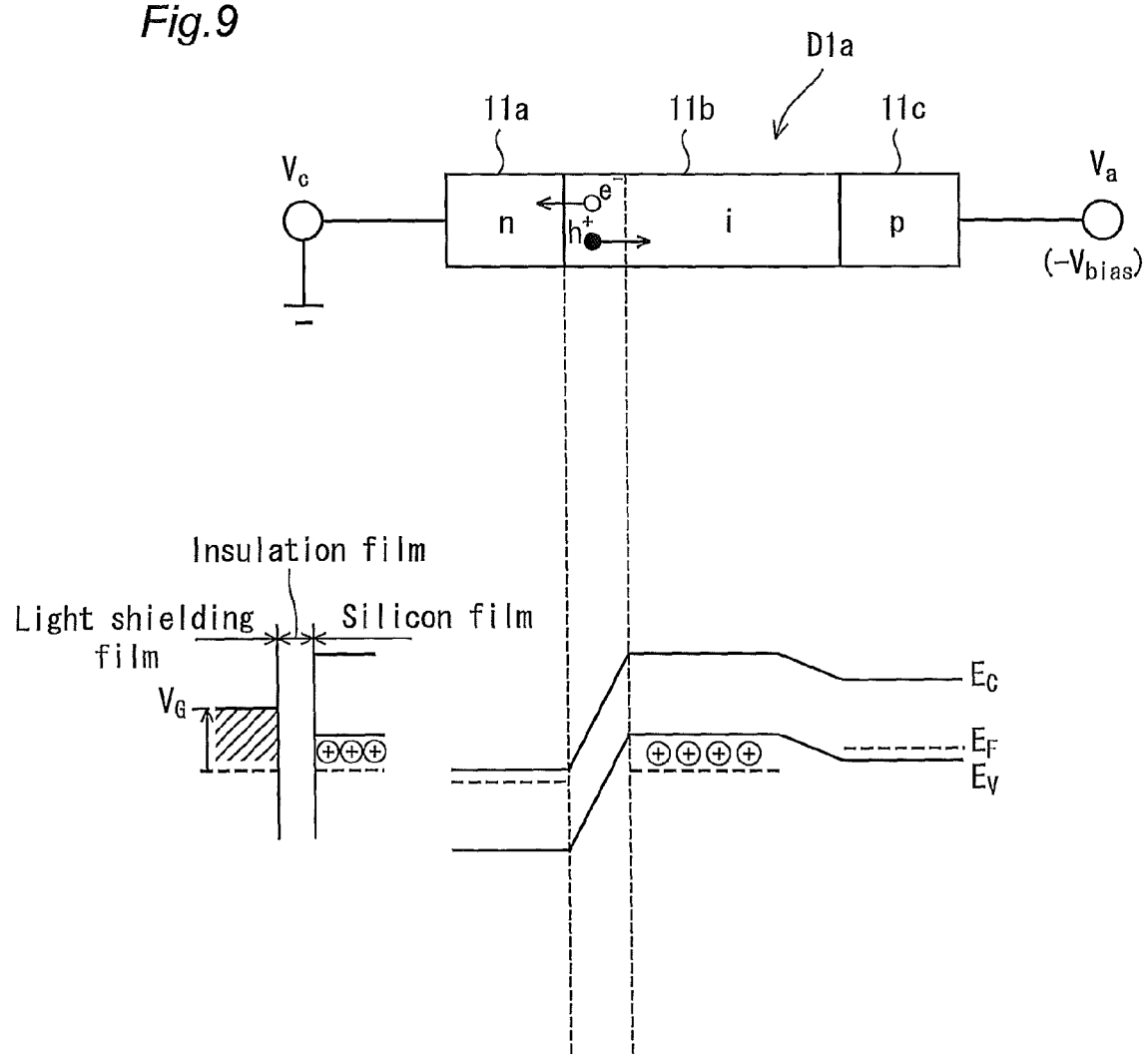
FIG. 9 is a diagram showing an operation state of a photodiode included in the display device shown in FIG. 1.
Figure 10:
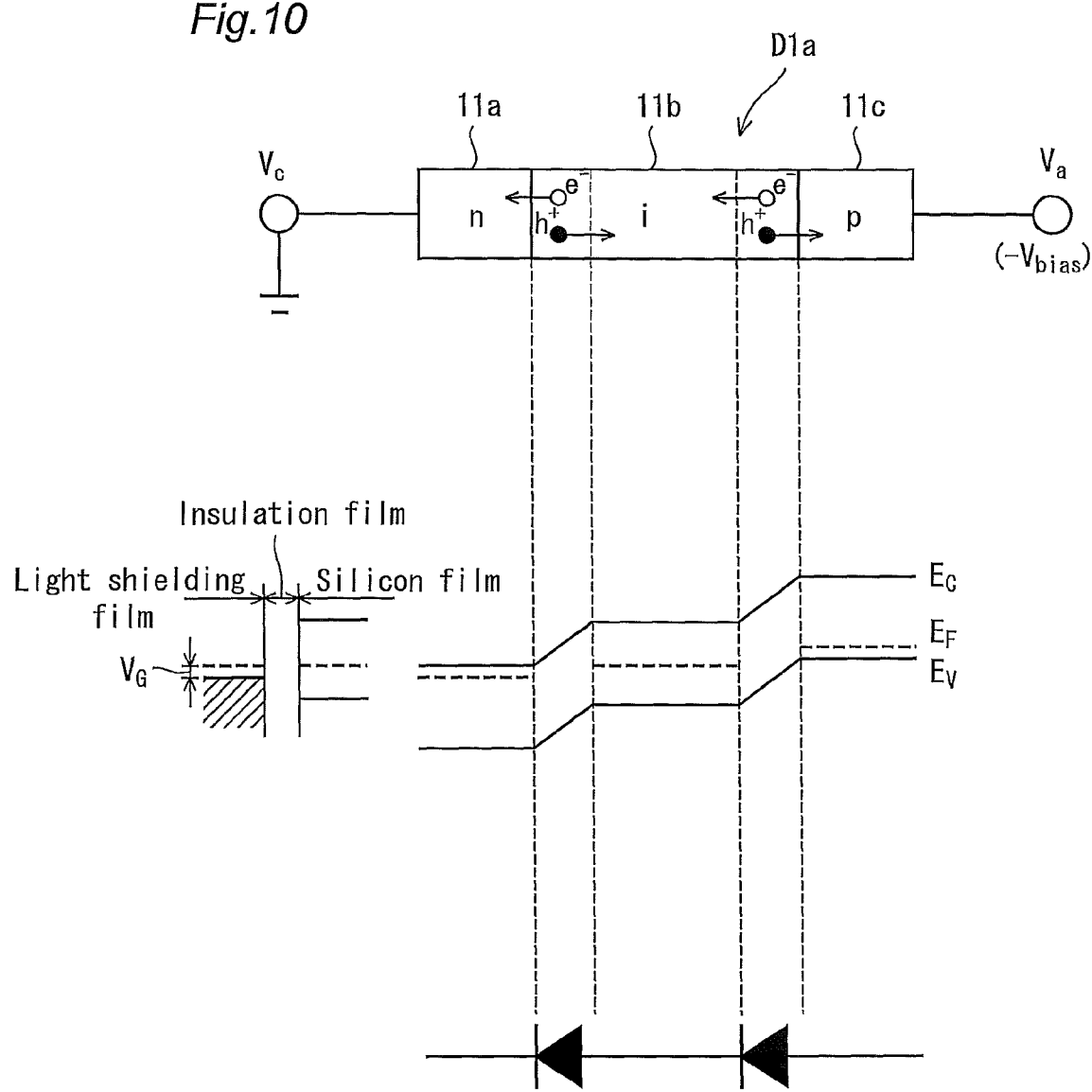
FIG. 10 is a diagram showing another operation state of a photodiode included in the display device shown in FIG. 1.

FIG. 9 is a schematic diagram showing the state of the photodiode D1a when operating in a mode B (described in detail later), and FIG. 10 is a schematic diagram showing the state of the photodiode D1a when operating in a mode A (described in detail later). In FIGS. 9 and 10, the top level shows the flow of free electrons and holes in the photodiode D1a, the middle level shows energy bands in the photodiode D1a, and the bottom level shows an equivalent circuit of the photodiode D1a.

Note that in the following description and FIGS. 9 and 10, Vc indicates the potential in an n layer 11a of the photodiode D1a, and Va indicates the potential in a p layer 11c in the photodiode D1a. Also, Vth_n indicates the threshold voltage in the case of assuming an n-channel MOS transistor in which the n layer 11a is the source and drain region, and the light shielding film LS is the gate electrode. Similarly, Vth_p indicates the threshold voltage in the case of assuming a p-channel MOS transistor in which the p layer 11c is the source and drain region, and the light shielding film LS is the gate electrode. Also, $E_C$ indicates the energy level in the conduction band, $E_F$ indicates the energy level in the forbidden band, and $E_V$ indicates the energy level in the valence band.

Immediately after resetting, the potential Vls of the light shielding film LS provided on the back face of the photodiode D1a and the other potentials satisfy the following expression (1).

$$Vls<(Va+Vth\_p)<(Vc+Vth\_n) \quad (1)$$

Accordingly, in this state, as shown in the top level and middle level in FIG. 9, the diode D1a operates in a mode (referred to as "mode B") in which free electrons ($e^-$) and holes ($h^+$) readily move only in the vicinity of the boundary of an i layer 11b on the n layer 11a side. Accordingly, as shown in the bottom level of FIG. 9, the flow of current is prevented by the i layer 11b in this mode B.

However, a certain amount of time after the start of the storage period, the potential Vls of the light shielding film LS provided on the back face of the photodiode D1a and the other potentials come to satisfy the following expression (2).

$$(Va+Vth\_p)<Vls<(Vc+Vth\_n) \quad (2)$$

In this state, as shown in the top level and middle level in FIG. 10, the photodiode D1a operates in a mode (referred to as "mode A") in which free electrons ($e^-$) and holes ($h^+$) readily move in the vicinity of the boundaries of the i layer 11b on both sides. As shown in the bottom level of FIG. 10, a current can flow smoothly in the photodiode D1a in this mode A.

In other words, photocurrent flows more smoothly when the diode D1a operates in the mode A than in the mode B, and it is possible to obtain sensor output that has superior linearity with respect to the received light amount.

Accordingly, at the beginning of the first detection period, the infrared LED of the backlight 3 is in the extinguished state while the photodiode D1a operates in the mode B, and then the infrared LED of the backlight 3 is lit at a time during the first detection period, thus enabling the detection of an object using reflected light from the infrared LED of the backlight 3 to be performed in the mode A instead of the mode B. This enables obtaining sensor output that has superior linearity.

In the holding period of the first pixel circuit 10a, the clock signal CLKa, the reset signal RSTa, and the readout signal RWSa fall to the low level. At this time, the transistor T1a is turned off. Even if light is incident on the photodiode D1a at this time, the transistor T1a is off, and the photodiode D1a and the gate of the transistor M1 are electrically cut off from each other, and therefore the potential Vinta does not change ((c) of FIG. 7).

In the readout period of the first pixel circuit 10a, the clock signal CLKa and the reset signal RSTa fall to the low level, and the readout signal RWSa rises to the readout high level. At this time, the transistor T1a is turned off. The potential Vinta at this time rises by (Cqa/Cpa)-times the amount of rise in the potential of the readout signal RWSa (note that Cpa is the overall capacitance value of the first pixel circuit 10a, and Cqa is the capacitance value of the capacitor C1a). The transistor M1a constitutes a source follower amplification circuit whose load is a transistor (not shown) included in the source driver circuit 6, and drives the output line OUTa in accordance with the potential Vinta ((d) in FIG. 7).

The second pixel circuit 10b operates similarly to the first pixel circuit 10a. In the reset period the potential Vintb is reset to a predetermined level, in the storage period the potential Vintb drops according to the amount of light that is incident while the clock signal CLKb is at the high level (second detection period), and in the holding period the potential Vintb does not change. In the readout period, the potential Vintb rises by (Cqb/Cpb)-times the amount of rise in the potential of the readout signal RWSb (note that Cpb is the overall capacitance value of the second pixel circuit 10b, and Cqb is the capacitance value of the capacitor C1b), and the transistor M1b drives the output line OUTb in accordance with the potential Vintb.

As described above, the first pixel circuit 10a of the present embodiment includes one photodiode D1a (photosensor), one storage node that stores a charge corresponding to the detected light amount, a transistor M1a (readout transistor) that has a control terminal connected to the storage node, and a transistor T1a (switching element for holding) that is provided on the path of the current that flows through the photodiode D1a and is turned on/off in accordance with the clock signal CLK. The transistor T1a is provided between the storage node and one end of the photodiode D1a, and the other end of the photodiode D1a is connected to the reset line RSTa. The transistor T1a is turned on in the first detection period in accordance with the clock signal CLKa. The second pixel circuit 10b has a configuration similar to that of the first pixel circuit 10a, and the transistor T1b included in the second pixel circuit 10b is turned on in the second detection period.

In this way, by providing the transistor T1a that is turned on in the first detection period on the path of the current that flows through the photodiode D1a, and providing the transistor T1b that is turned on in the second detection period on the path of the current that flows through the photodiode D1b, it is possible to constitute the first pixel circuit 10a that detects light in the first detection period and holds the detected light amount when not in the first detection period and the second pixel circuit 10b that detects light in the second detection period and holds the detected light amount when not in the second detection period.

Second Embodiment

Figure 11:
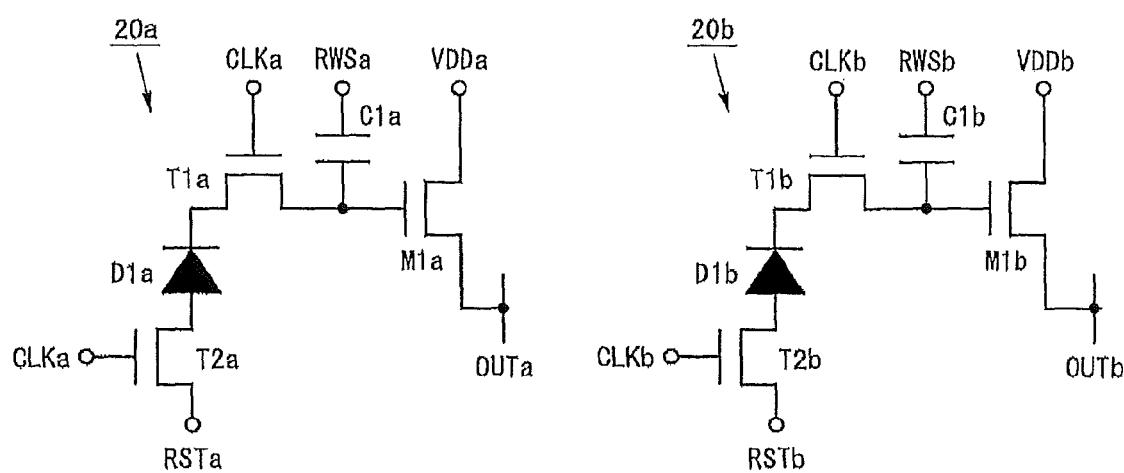
FIG. 11 is a circuit diagram of sensor pixel circuits according to a second embodiment of the present invention.

FIG. 11 is a circuit diagram of pixel circuits according to a second embodiment of the present invention. As shown in FIG. 11, a first pixel circuit 20a includes transistors T1a, T2a, and M1a, the photodiode D1a, and the capacitor C1a. A second pixel circuit 20b includes transistors T1b, T2b, and M1b, the photodiode D1b, and the capacitor C1b. The transistors T1a, T2a, M1a, T1b, T2b, and M1b are each an N-type TFT.

In the first pixel circuit 20a, the gates of the transistors T1a and T2a are connected to the clock line CLKa. The source of the transistor T2a is connected to the reset line RSTa, and the drain is connected to the anode of the photodiode D1a. The cathode of the photodiode D1a is connected to the source of the transistor T1a. The drain of the transistor T1a is connected to the gate of the transistor M1a. The drain of the transistor M1a is connected to the power supply line VDDa, and the source is connected to the output line OUTa. The capacitor C1a is provided between the gate of the transistor M1a and the readout line RWSa. In the first pixel circuit 20a, the node connected to the gate of the transistor M1a serves as a storage node, and the transistor M1a functions as a readout transistor. The second pixel circuit 20b has the same configuration as the first pixel circuit 20a.

Figure 12:
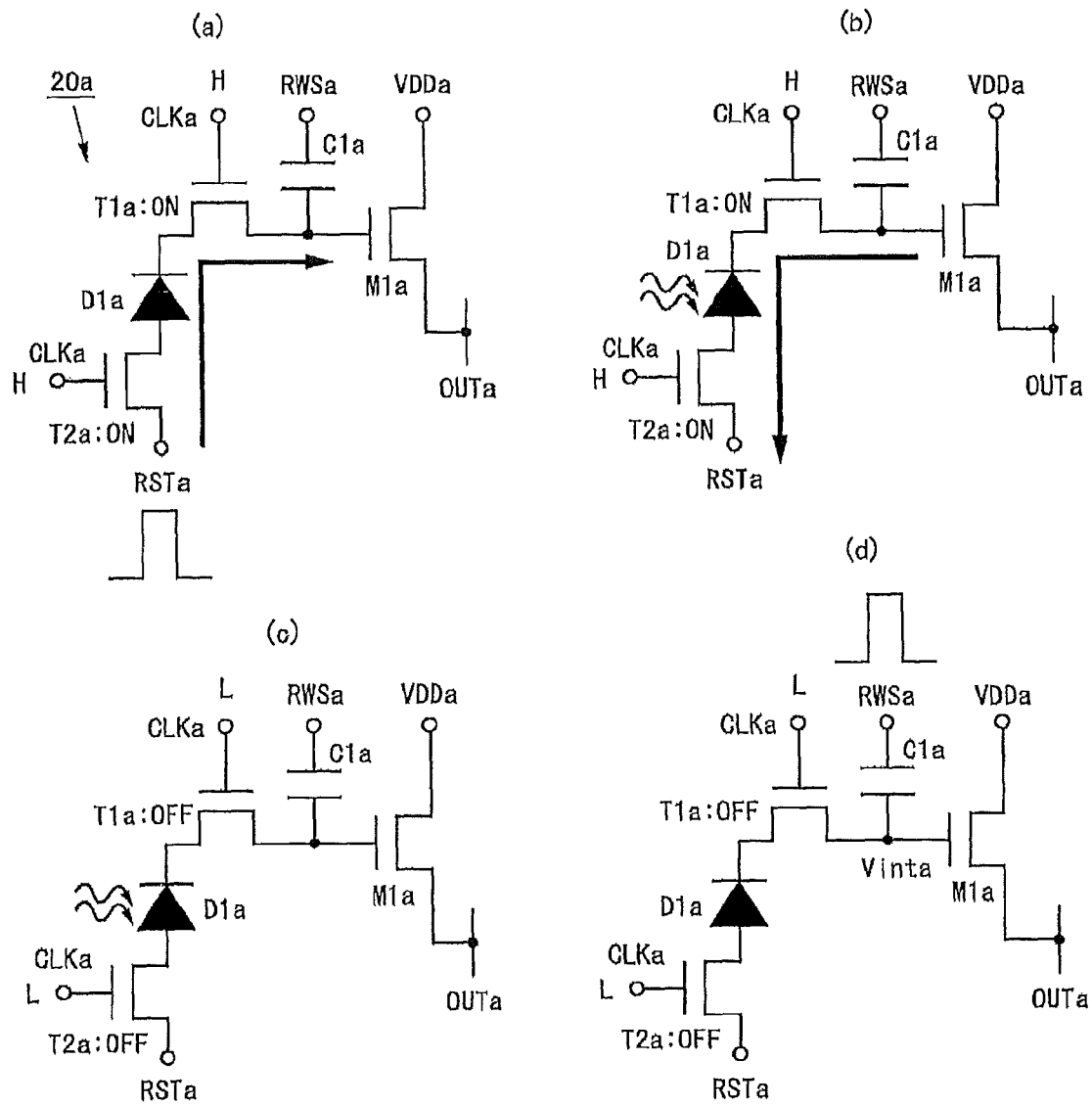
FIG. 12 is a diagram showing operations of the sensor pixel circuits shown in FIG. 11.

FIG. 12 is a diagram showing operations of the first pixel circuit 20a. As shown in FIG. 12, in a frame in which input is performed by the sensor pixel circuits 9, the first pixel circuit 20a performs (a) resetting, (b) storage, (c) holding, and (d) readout in a frame period. Signal waveform diagrams of the first and second pixel circuits 20a and 20b are the same as those in the first embodiment (FIG. 8). With the exception that the transistor T2a is turned on/off according to the same timing as the transistor T1a, the first pixel circuit 20a operates similarly to the first pixel circuit 10a in the first embodiment. The same follows for the second pixel circuit 20b as well.

As described above, the first pixel circuit 20a of the present embodiment includes one photodiode D1a (photosensor), one storage node that stores a charge corresponding to the detected light amount, a transistor M1a (readout transistor) that has a control terminal connected to the storage node, and two transistors T1a and T2a (two switching elements for holding). The transistor T1a is provided between the storage node and one end of the photodiode D1a, and the transistor T2a is provided between the reset line RSTa and the other end of the photodiode D1a.

The transistors T1a and T2a are turned on in the first detection period in accordance with the clock signal CLKa. The second pixel circuit 20b has a configuration similar to that of the first pixel circuit 20a, and the transistors T1b and T2b included in the second pixel circuit 20b are turned on in the second detection period.

In this way, by providing the transistors T1a and T2a that are turned on in the first detection period on respective sides of the photodiode D1a, and providing the transistors T1b and T2b that are turned on in the second detection period on respective sides of the photodiode D1b, it is possible to constitute the first pixel circuit 20a that detects light in the first detection period and holds the detected light amount when not in the first detection period and the second pixel circuit 20b that detects light in the second detection period and holds the detected light amount when not in the second detection period.

Also, in the first pixel circuit 20a, the transistor T2a provided between the photodiode D1a and the reset line RSTa is turned off when not in the first detection period. For this reason, there is a reduction in fluctuation of the cathode potential of the photodiode D1a caused by the current flowing through the photodiode D1a, and there is a reduction in the difference between the potentials applied to the respective sides of the transistor T1a. This enables reducing leakage current that flows through the transistor T1a, thus preventing fluctuation in the potential of the storage node and improving the detection precision. A similar effect is obtained with the second pixel circuit 20b as well.

Third Embodiment

Figure 13:
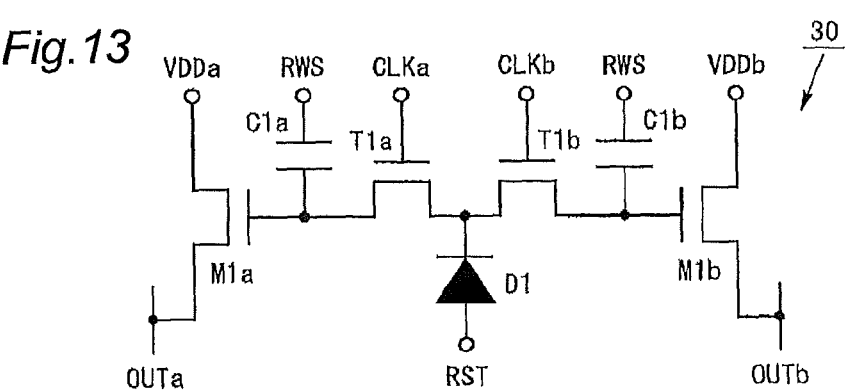
FIG. 13 is a circuit diagram of a sensor pixel circuit according to a third embodiment of the present invention.

FIG. 13 is a circuit diagram of a pixel circuit according to a third embodiment of the present invention. As shown in FIG. 13, a pixel circuit 30 includes transistors T1a, T1b, M1a, and M1b, a photodiode D1, and capacitors C1a and C1b. The transistors T1a, T1b, M1a, and M1b are each an N-type TFT. In FIG. 13, the left half corresponds to the first pixel circuit, and the right half corresponds to the second pixel circuit. The pixel circuit 30 is connected to the clock lines CLKa and CLKb, the reset line RST, the readout line RWS, the power supply lines VDDa and VDDb, and the output lines OUTa and OUTb.

As shown in FIG. 13, the anode of the photodiode D1 is connected to the reset line RST, and the cathode is connected to the sources of the transistors T1a and T1b. The gate of the transistor T1a is connected to the clock line CLKa, and the drain is connected to the gate of the transistor M1a. The drain of the transistor M1a is connected to the power supply line VDDa, and the source is connected to the output line OUTa. The capacitor C1a is provided between the gate of the transistor M1a and the readout line RWS. The gate of the transistor T1b is connected to the clock line CLKb, and the drain is connected to the gate of the transistor M1b. The drain of the transistor M1b is connected to the power supply line VDDb, and the source is connected to the output line OUTb. The capacitor C1b is provided between the gate of the transistor M1b and the readout line RWS. In the pixel circuit 30, the node connected to the gate of the transistor M1a serves as a first storage node, the node connected to the gate of the transistor M1b serves as a second storage node, and the transistors M1a and M1b function as readout transistors.

Figure 14:
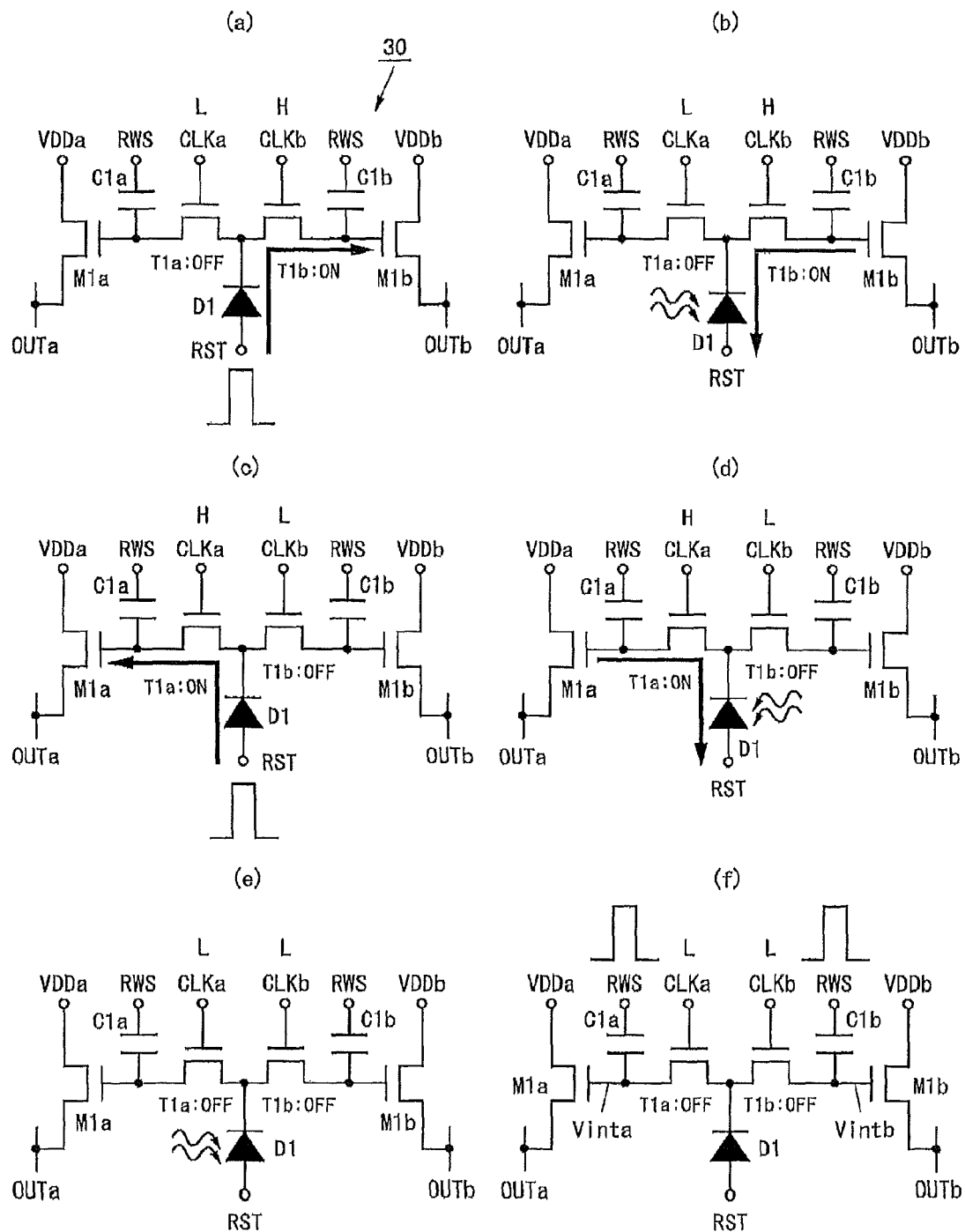
FIG. 14 is a diagram showing operations of the sensor pixel circuit shown in FIG. 13.

FIG. 14 is a diagram showing operations of the pixel circuit 30. As shown in FIG. 14, in a frame in which input is performed by the sensor pixel circuits 9, the pixel circuit 30 performs (a) resetting in the second detection period, (b) storage in the second detection period, (c) resetting in the first detection period, (d) storage in the first detection period, (e) holding, and (f) readout in a frame period.

Figure 15:
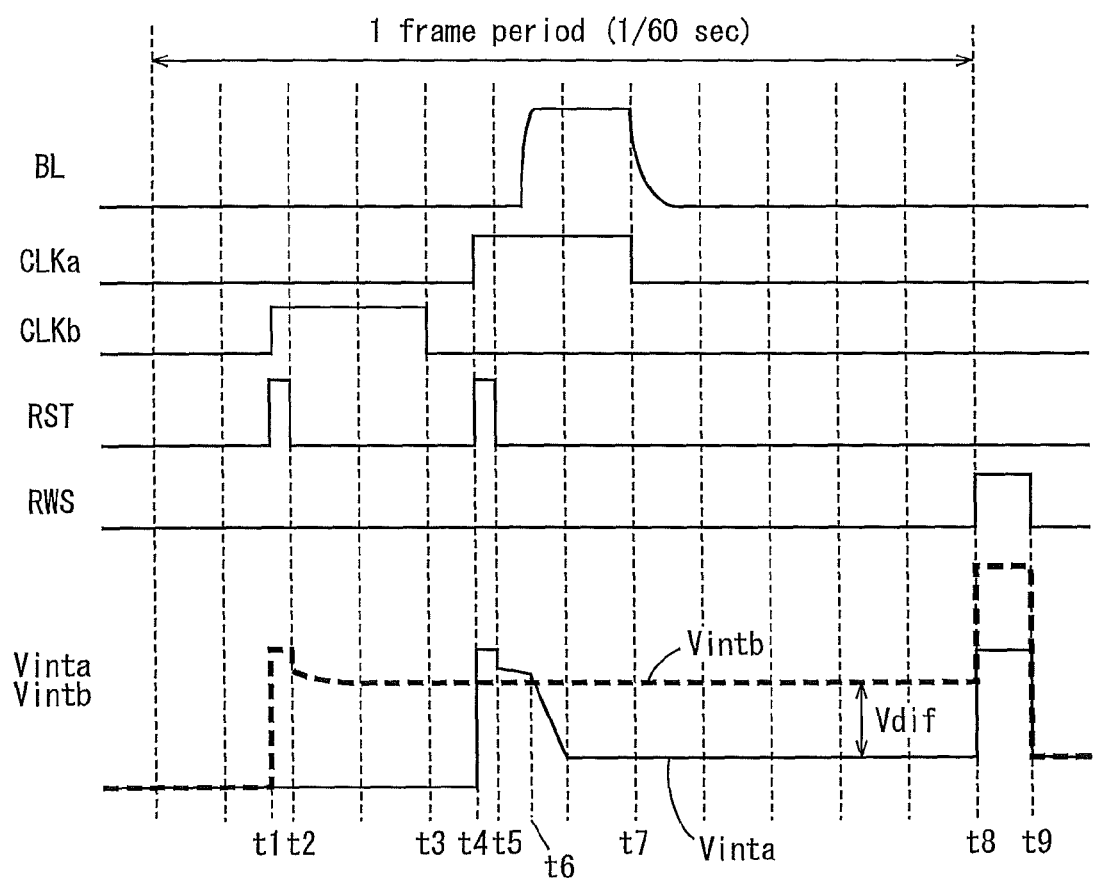
FIG. 15 is a signal waveform diagram of the sensor pixel circuit shown in FIG. 13.

FIG. 15 is a signal waveform diagram of the pixel circuit 30. In FIG. 15, Vinta indicates the potential of the first storage node (the gate potential of the transistor M1a), and Vintb indicates the potential of the second storage node (the gate potential of the transistor M1b). In FIG. 15, the reset period in the second detection period is from time t1 to time t2, the storage period in the second detection period is from time t2 to time t3, the reset period in the first detection period is from time t4 to time t5, the storage period in the first detection period is from time t5 to time t7, the holding period is from time t3 to time t4 and from time t7 to time t8, and the readout period is from time t8 to time t9.

In the reset period in the second detection period, the clock signal CLKb rises to the high level, the clock signal CLKa and the readout signal RWS fall to the low level, and the reset signal RST rises to the reset high level. At this time, the transistor T1a is turned off, and the transistor T1b is turned on. Accordingly, current (forward biased current from the photodiode D1) flows from the reset line RST to the second storage node via the photodiode D1 and the transistor T1b ((a) in FIG. 14), and the potential Vintb is reset to a predetermined level.

In the storage period in the second detection period, the clock signal CLKb rises to the high level, and the clock signal CLKa, the reset signal RST, and the readout signal RWS fall to the low level. At this time, the transistor T1a is turned off, and the transistor T1b is turned on. When light is incident on the photodiode D1 at this time, current (photocurrent from the photodiode D1) flows from the second storage node to the reset line RST via the transistor T1b and the photodiode D1, and charge is drawn out from the second storage node ((b) in FIG. 14). Accordingly, the potential Vintb drops according to the amount of light that was incident in the second detection period. Note that the potential Vinta does not change in this period.

In the reset period in the first detection period, the clock signal CLKa rises to the high level, the clock signal CLKb and the readout signal RWS fall to the low level, and the reset signal RST rises to the reset high level. At this time, the transistor T1a is turned on, and the transistor T1b is turned off. Accordingly, current (forward biased current from the photodiode D1) flows from the reset line RST to the first storage node via the photodiode D1 and the transistor T1a ((c) in FIG. 14), and the potential Vinta is reset to a predetermined level.

In the storage period in the first detection period, the clock signal CLKa rises to the high level, and the clock signal CLKb, the reset signal RST, and the readout signal RWS fall to the low level. At this time, the transistor T1a is turned on, and the transistor T1b is turned off. When light is incident on the photodiode D1 at this time, current (photocurrent from the photodiode D1) flows from the first storage node to the reset line RST via the transistor T1a and the photodiode D1, and charge is drawn out from the first storage node ((d) in FIG. 14). Accordingly, the potential Vinta drops according to the amount of light that was incident in the first detection period. Note that the potential Vintb does not change in this period.

In the holding period, the clock signals CLKa and CLKb, the reset signal RST, and the readout signal RWS fall to the low level. At this time, the transistors T1a and T1b are turned off. Even if light is incident on the photodiode D1 at this time, the transistors T1a and T1b are off, and the photodiode D1 and the gates of the transistors M1a and M1b are electrically cut off from each other, and therefore the potentials Vinta and Vintb do not change ((e) of FIG. 14).

In the readout period, the clock signals CLKa and CLKb and the reset signal RST fall to the low level, and the readout signal RWS rises to the readout high level. At this time, the transistors T1a and T1b are turned off. The potentials Vinta and Vintb at this time rise by the amount of rise in the potential of the readout signal RWS, a current Ia whose amount corresponds to the potential Vinta flows between the drain and source of the transistor M1a, and a current Ib whose amount corresponds to the potential Vintb flows between the drain and source of the transistor M1b ((f) in FIG. 14). The current Ia is input to the source driver circuit 6 via the output line OUTa, and the current Ib is input to the source driver circuit 6 via the output line OUTb.

As described above, the pixel circuit 30 of the present embodiment has a configuration in which one photodiode D1 (photosensor) is shared between the first and second pixel circuits 10a and 10b of the first embodiment. The cathode of the shared photodiode D1 is connected to the source of the transistor T1a included in the portion corresponding to the first pixel circuit, and is connected to the source of the transistor T1b included in the portion corresponding to the second pixel circuit.

Similarly to the first and second pixel circuits 10a and 10b of the first embodiment, the pixel circuit 30 enables detecting the light amount in the first detection period and the light amount in the second detection period. Also, since the one photodiode D1 is shared between the two types of pixel circuits, it is possible to cancel out the influence of variation in the photodiode sensitivity characteristics and accurately obtain the difference between the light amount in the first detection period and the light amount in the second detection period. It is also possible to reduce the number of photodiodes, thus raising the aperture ratio and raising the sensitivity of the sensor pixel circuits.

Fourth Embodiment

Figure 16:
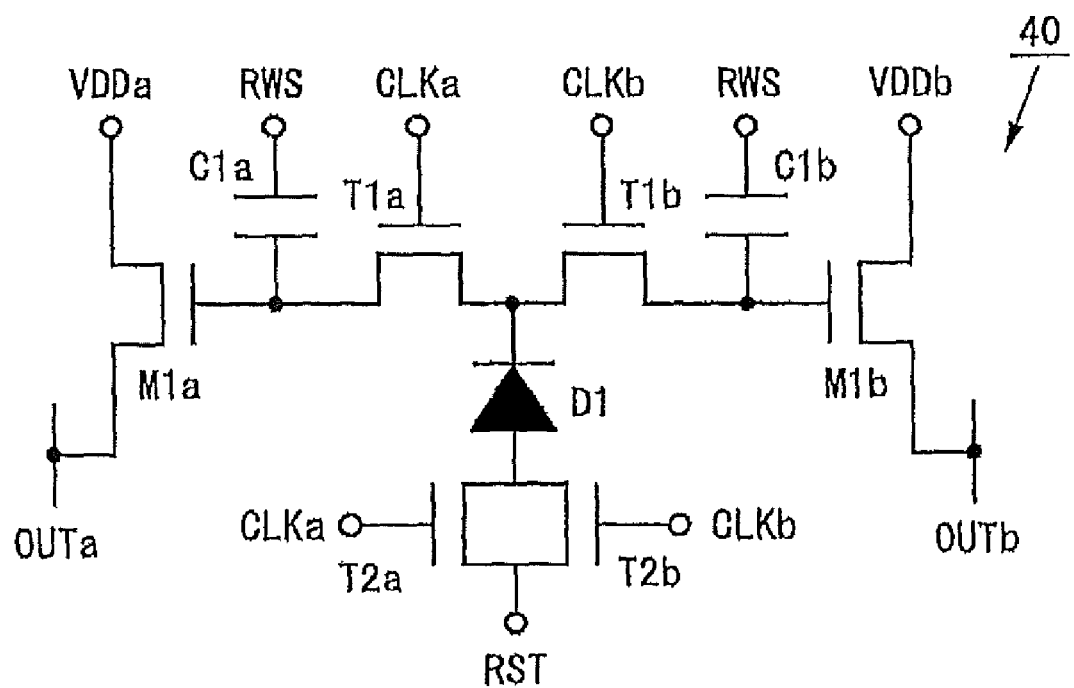
FIG. 16 is a circuit diagram of a sensor pixel circuit according to a fourth embodiment of the present invention.

FIG. 16 is a circuit diagram of a pixel circuit according to a fourth embodiment of the present invention. A pixel circuit 40 shown in FIG. 16 includes transistors T1a, T1b, T2a, T2a, M1a, and M1b, the photodiode D1, and the capacitors C1a and C1b. The transistors T1a, T1b, T2a, T2b, M1a, and M1b are each an N-type TFT. In FIG. 16, the left half corresponds to the first pixel circuit, and the right half corresponds to the second pixel circuit. The pixel circuit 40 is connected to clock lines CLKa and CLKb, the reset line RST, the readout line RWS, the power supply lines VDDa and VDDb, and the output lines OUTa and OUTb.

As shown in FIG. 16, the gates of the transistors T1a and T2a are connected to the clock line CLKa, and the gates of the transistors T2a and T2b are connected to the clock line CLKb. The sources of the transistors T2a and T2b are connected to the reset line, and the drains are connected to the anode of the photodiode D1. The cathode of the photodiode D1 is connected to the sources of the transistors T1a and T1b. The drain of the transistor M1a is connected to the power supply line VDDa, and the source is connected to the output line OUTa. The capacitor C1a is provided between the gate of the transistor M1a and the readout line RWS. The gate of the transistor T1b is connected to the clock line CLKb, and the drain is connected to the gate of the transistor M1b. The drain of the transistor M1b is connected to the power supply line VDDb, and the source is connected to the output line OUTb. The capacitor C1b is provided between the gate of the transistor M1b and the readout line RWS. In the pixel circuit 40, the node connected to the gate of the transistor M1a serves as a first storage node, the node connected to the gate of the transistor M1b serves as a second storage node, and the transistors M1a and M1b function as readout transistors.

Figure 17:
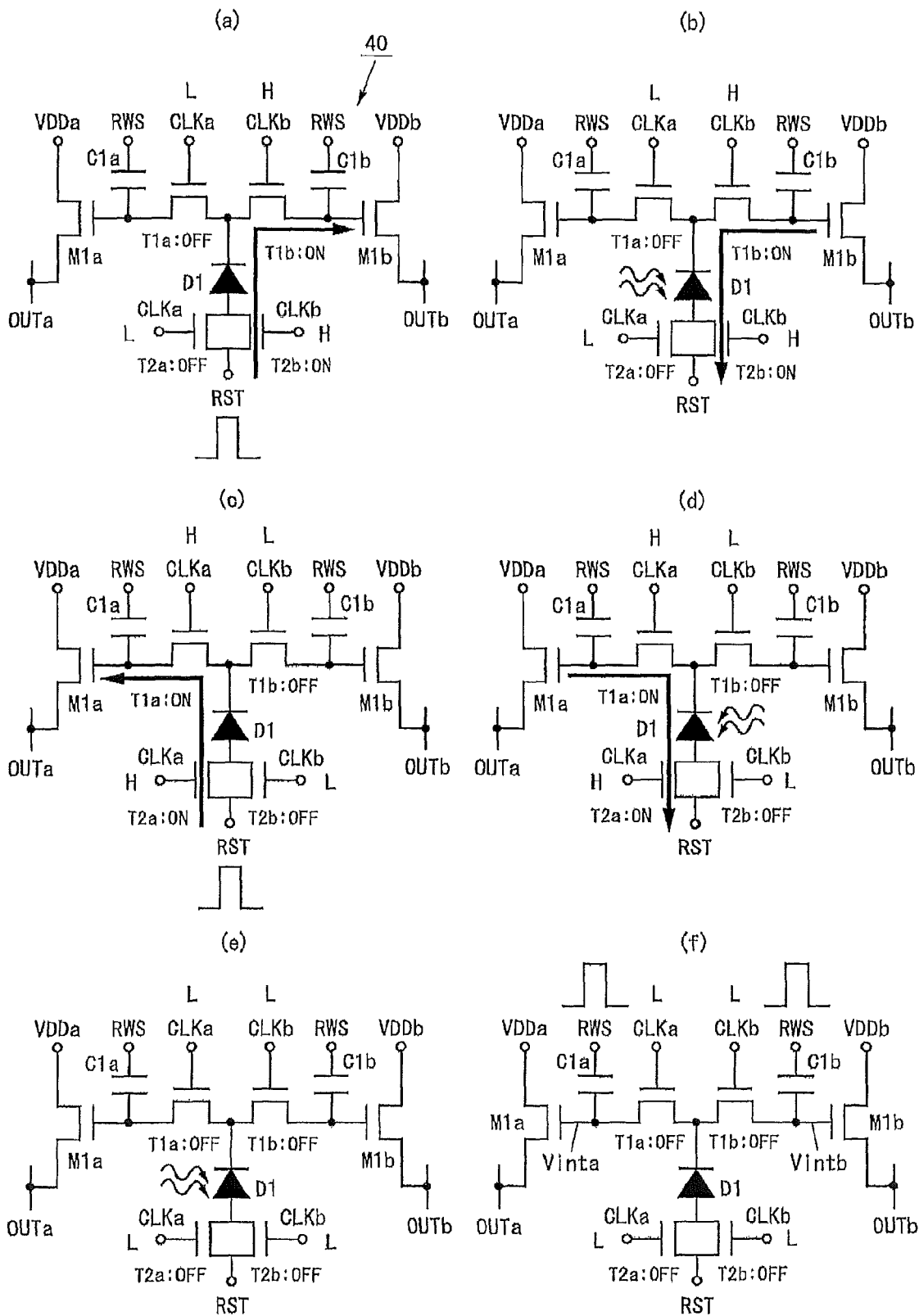
FIG. 17 is a diagram showing operations of the sensor pixel circuit shown in FIG. 16.

FIG. 17 is a diagram showing operations of the pixel circuit 40. As shown in FIG. 17, in a frame in which input is performed by the sensor pixel circuits 9, the pixel circuit 40 performs (a) resetting in the second detection period, (b) storage in the second detection period, (c) resetting in the first detection period, (d) storage in the first detection period, (e) holding, and (f) readout in a frame period. A signal waveform diagram of the pixel circuit 40 is the same as that in the fourth embodiment (FIG. 15). With the exception that the transistors T2a and T2b are turned on/off according to the same timing as that of the transistors T1a and T2a, the pixel circuit 40 operates similarly to the pixel circuit 30 of the third embodiment.

As described above, the pixel circuit 40 of the present embodiment has a configuration in which one photodiode D1 (photosensor) is shared between the first and second pixel circuits 20a and 20b of the second embodiment. The cathode of the shared photodiode D1 is connected to the source of the transistor T1a included in the portion corresponding to the first pixel circuit, and is connected to the source of the transistor T1b included in the portion corresponding to the second pixel circuit. The anode of the photodiode D1 is connected to the drain of the transistor T2a included in the portion corresponding to the first pixel circuit, and is connected to the drain of the transistor T2b included in the portion corresponding to the second sensor pixel circuit.

Similarly to the first and second pixel circuits 20a and 20b of the second embodiment, the pixel circuit 40 enables detecting the light amount in the first detection period and the light amount in the second detection period. Also, similarly to the second embodiment, this enables reducing leakage current that flows through the transistors T1a and T1b, thus preventing fluctuation in the potentials of the first and second storage nodes and improving the detection precision. Also, since the one photodiode D1 is shared between the two types of pixel circuits, it is possible to cancel out the influence of variation in the photodiode sensitivity characteristics and accurately obtain the difference between the light amount in the first detection period and the light amount in the second detection period. It is also possible to reduce the number of photodiodes, thus raising the aperture ratio and raising the sensitivity of the sensor pixel circuits.

Fifth Embodiment

Figure 18:
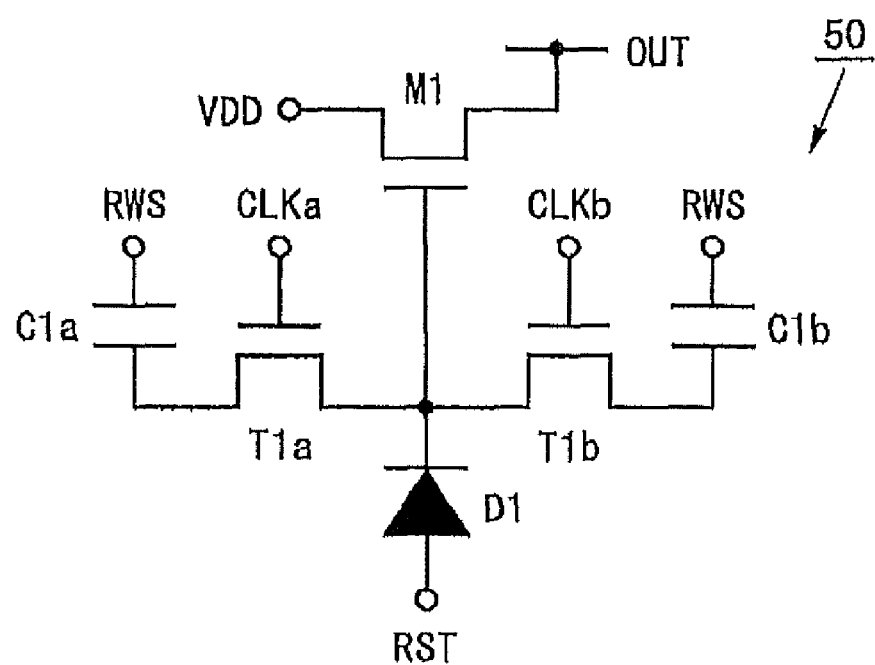
FIG. 18 is a circuit diagram of a sensor pixel circuit according to a fifth embodiment of the present invention.

FIG. 18 is a circuit diagram of a pixel circuit according to a fifth embodiment of the present invention. A pixel circuit 50 shown in FIG. 18 includes the transistors T1a, T1b, and M1, the photodiode D1, and the capacitors C1a and C1b. The transistors T1a, T1b, and M1 are each an N-type TFT. In FIG. 18, the left half corresponds to the first pixel circuit, and the right half corresponds to the second pixel circuit. The pixel circuit 50 is connected to clock lines CLKa and CLKb, the reset line RST, the readout line RWS, the power supply line VDD, and the output line OUT.

As shown in FIG. 18, the anode of the photodiode D1 is connected to the reset line RST, and the cathode is connected to the sources of the transistors T1a and T1b and the gate of the transistor M1. The gate of the transistor T1a is connected to the clock line CLKa, and the gate of the transistor T1b is connected to the clock line CLKb. The capacitor C1a is provided between the drain of the transistor T1a and the readout line RWS. The capacitor C1b is provided between the drain of the transistor T1b and the readout line RWS. The drain of the transistor M1 is connected to the power supply line VDD, and the source is connected to the output line OUT. In the pixel circuit 50, the node connected to the drain of the transistor T1a serves as a first storage node, the node connected to the drain of the transistor T1b serves as a second storage node, and the transistor M1 functions as a readout transistor.

Figure 19:
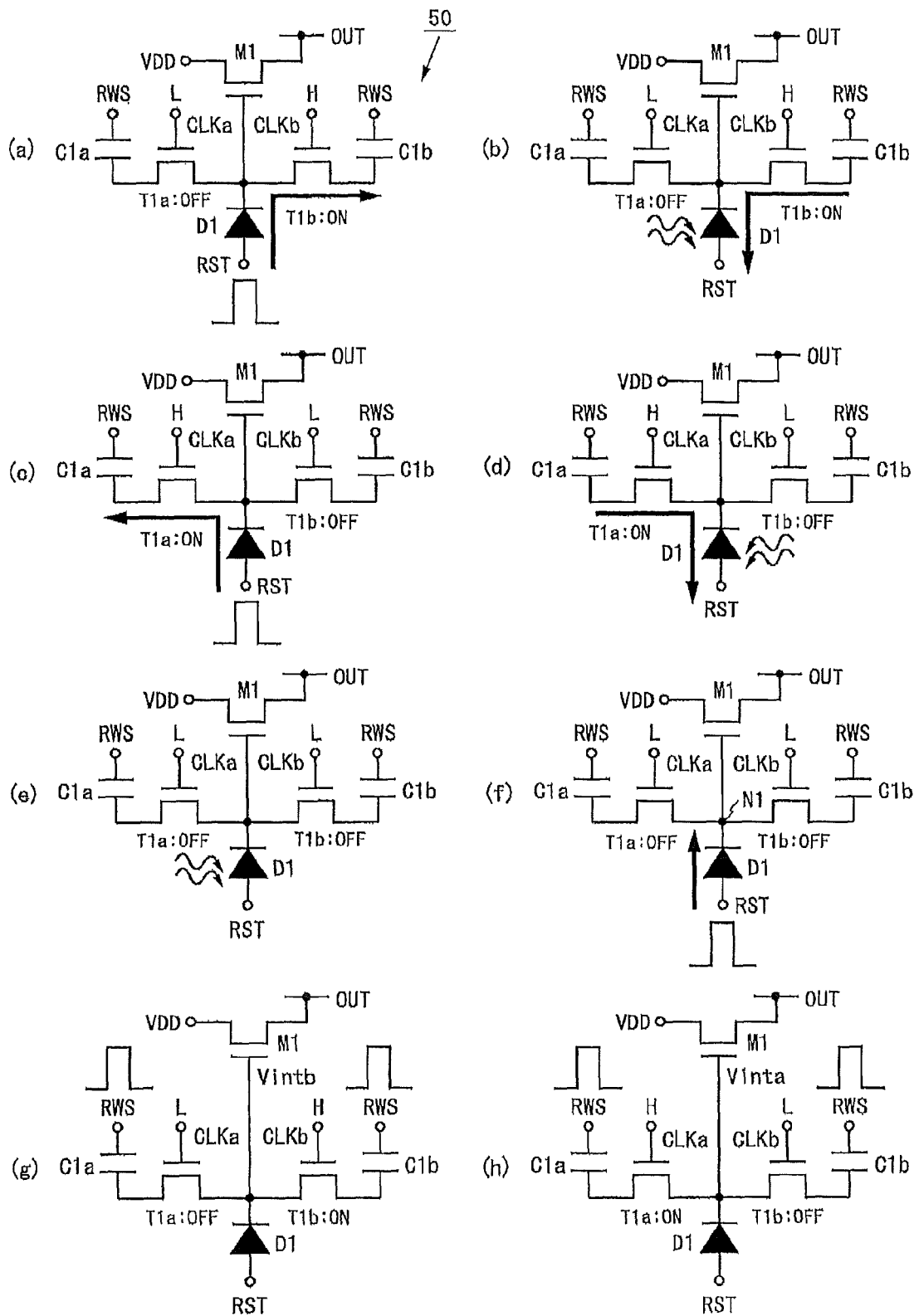
FIG. 19 is a diagram showing operations of the sensor pixel circuit shown in FIG. 18.

FIG. 19 is a diagram showing operations of the pixel circuit 50. As shown in FIG. 19, in a frame in which input is performed by the sensor pixel circuits 9, the pixel circuit 50 performs (a) resetting in the second detection period, (b) storage in the backlight extinguished period, (c) resetting in the first detection period, (d) storage in the first detection period, (e) holding, (f) initialization immediately before readout, (g) readout of the light amount in the backlight extinguished period, and (h) readout of the light amount in the backlight lit period in a frame period. The initialization immediately before readout is performed two times, namely before readout of the light amount in the backlight extinguished period and before readout of the light amount in the backlight lit period.

Figure 20:
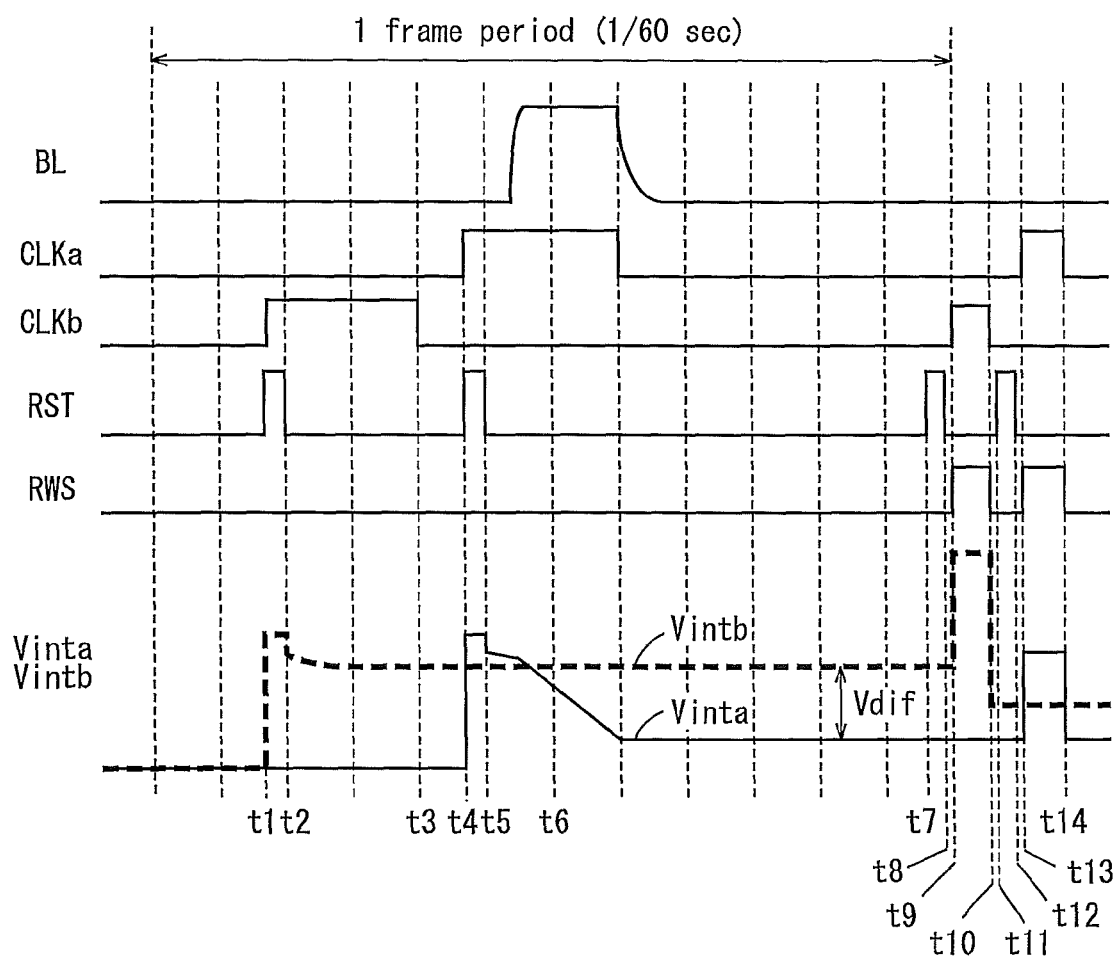
FIG. 20 is a signal waveform diagram of the sensor pixel circuit shown in FIG. 18.

FIG. 20 is a signal waveform diagram of the pixel circuit 50. In FIG. 20, Vinta indicates the potential of the first storage node (the drain potential of the transistor T1a), and Vintb indicates the potential of the second storage node (the drain potential of the transistor T1b). In FIG. 20, the reset period in the second detection period is from time t1 to time t2, the storage period in the second detection period is from time t2 to time t3, the reset period in the first detection period is from time t4 to time t5, the storage period in the first detection period is from time t5 to time t6, the holding period is from time t3 to time t4 and from time t6 to time t7, the period of the initialization immediately before readout is from time t7 to time t8 and from time t11 to time 12, the period of the readout of the light amount in the backlight extinguished period is from time t9 to time t10, and the period of the readout of the light amount in the backlight lit period is from time t13 to time t14.

In the reset period in the second detection period, the storage period in the second detection period, the reset period in the backlight extinguished period, the storage period in the first detection period, and the holding period, the pixel circuit 50 operates similarly to the pixel circuit 30 in the third embodiment ((a) to (e) in FIG. 20).

In the period of initialization immediately before readout, the clock signals CLKa and CLKb and the readout signal RWS fall to the low level, and the reset signal RST rises to the reset high level. At this time, the transistors T1a and T1b are turned off. Accordingly, current (forward biased current from the photodiode D1) flows from the reset line RST, through the photodiode D1, to a node N1 connected to the cathode of the photodiode D1 ((f) in FIG. 19), and the potential of the node N1 is reset to a predetermined level.

In the period of readout of the light amount in the backlight extinguished period, the clock signal CLKb rises to the high level, the clock signal CLKa and the reset signal RST fall to the low level, and the readout signal RWS rises to the readout high level. At this time, the transistor T1a is turned off, and the transistor T1b is turned on. The potential Vintb at this time rises by (Cqb/Cpb)-times the amount of rise in the potential of the readout signal RWS (note that Cpb is the capacitance value of the portion corresponding to the second pixel circuit, and Cqb is the capacitance value of the capacitor C1b), and the transistor M1b drives the output line OUT in accordance with the potential Vintb ((g) of FIG. 19).

In the period of readout of the light amount in the backlight lit period, the clock signal CLKa is rises to the high level, the clock signal CLKb and the reset signal RST fall to the low level, and the readout signal RWS rises to the readout high level. At this time, the transistor T1a is turned on, and the transistor T1b is turned off. The potential Vinta at this time rises by (Cqa/Cpa)-times the amount of rise in the potential of the readout signal RWS (note that Cpa is the capacitance value of the portion corresponding to the first pixel circuit, and Cqa is the capacitance value of the capacitor C1a), and the transistor M1a drives the output line OUT in accordance with the potential Vinta ((h) of FIG. 19).

As described above, the pixel circuit 50 of the present embodiment has a configuration in which the photodiode D1 and the transistor M1 (readout transistor) are shared between the first and second pixel circuits 10a and 10b of the first embodiment. The gate (control terminal) of the shared transistor M1 is connected to one end of the shared photodiode D1, one end of the transistor T1a included in the portion corresponding to the first pixel circuit, and one end of the transistor T1b included in the portion corresponding to the second pixel circuit. In this way, the gate of the transistor M1 is configured so as to be capable of electrical connection to the first and second storage nodes via the transistors T1a and T1b.

Similarly to the pixel circuit 30 of the third embodiment, the pixel circuit 50 enables detecting the light amount in the first detection period and the light amount in the second detection period. Also, sharing the one photodiode D1 between two types of pixel circuits obtains an effect similar to that of the third embodiment. Also, since the transistor M1 is shared between the two types of pixel circuits, it is possible to cancel out the influence of variation in the threshold value characteristics of the transistor M1 and accurately obtain the difference between the light amount in the first detection period and the light amount in the second detection period.

Sixth Embodiment

Figure 21:
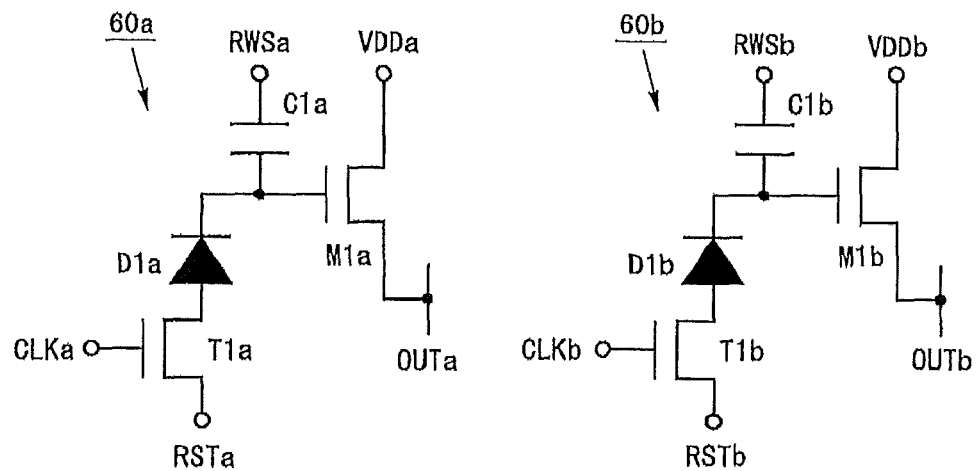
FIG. 21 is a circuit diagram of sensor pixel circuits according to a sixth embodiment of the present invention.

FIG. 21 is a circuit diagram of pixel circuits according to a sixth embodiment of the present invention. As shown in FIG. 21, a first pixel circuit 60a includes the transistors T1a and M1a, the photodiode D1a, and the capacitor C1a. A second pixel circuit 60b includes the transistors T1b and M1b, the photodiode D1b, and the capacitor C1b. The transistors T1a, M1a, T1b, and M1b are each an N-type TFT.

In the first pixel circuit 60a, the source of the transistor T1a is connected to the reset line RSTa, the gate is connected to the clock line CLKa, and the drain is connected to the anode of the photodiode D1a. The cathode of the photodiode D1a is connected to the gate of the transistor M1a. The drain of the transistor M1a is connected to the power supply line VDDa, and the source is connected to the output line OUTa. The capacitor C1a is provided between the gate of the transistor M1a and the readout line RWSa. In the first pixel circuit 60a, the node connected to the gate of the transistor M1a serves as a storage node, and the transistor M1a functions as a readout transistor. The second pixel circuit 60b has the same configuration as the first pixel circuit 60a.

The first and second pixel circuits 60a and 60b operate similarly to the first and second pixel circuits 10a and 10b of the first embodiment (see FIG. 7). Signal waveform diagrams of the first and second pixel circuits 20a and 20b are the same as those in the first embodiment (FIG. 8).

As described above, the first pixel circuit 60a of the present embodiment includes the same constituent elements as the first pixel circuit 10a of the first embodiment. However, in the first pixel circuit 60a, the photodiode D1a is provided between the storage node and one end of the transistor T1a, and the other end of the transistor T1a is connected to the reset line RSTa. The transistor T1a is turned on in the first detection period in accordance with the clock signal CLKa. The second pixel circuit 60b has a configuration similar to that of the first pixel circuit 60a, and the transistor T1b included in the second pixel circuit 60b is turned on in the second detection period.

In this way, by providing the transistor T1a that is turned on in the first detection period on the path of the current that flows through the photodiode D1a, and providing the transistor T1b that is turned on in the second detection period on the path of the current that flows through the photodiode D1b, it is possible to constitute the first pixel circuit 60a that detects light in the first detection period and holds the detected light amount when not in the first detection period and the second pixel circuit 60b that detects light in the second detection period and holds the detected light amount when not in the second detection period.

Seventh Embodiment

Figure 22:
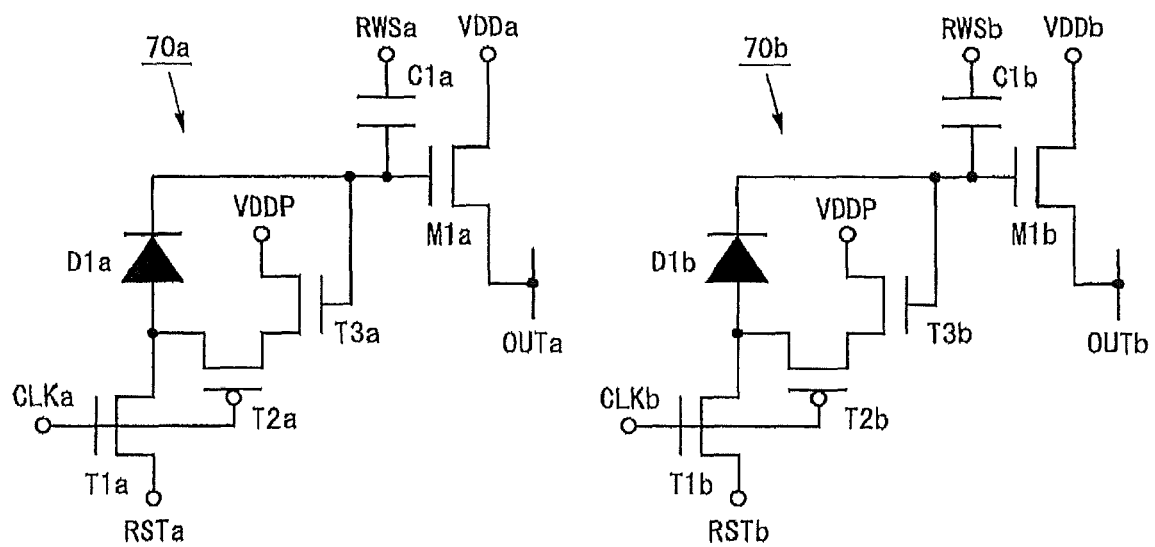
FIG. 22 is a circuit diagram of sensor pixel circuits according to a seventh embodiment of the present invention.

FIG. 22 is a circuit diagram of pixel circuits according to a seventh embodiment of the present invention. As shown in FIG. 22, a first pixel circuit 70a includes transistors T1a, T2a, T3a, and M1a, the photodiode D1a, and the capacitor C1a. The second pixel circuit 70b includes transistors T1b, T2b, T3b, and M1b, the photodiode D1b, and the capacitor C1b. The transistors T1a, T3a, M1a, T1b, T3b, and M3b are each an N-type TFT, and the transistors T2a and T2b are each a P-type TFT. A high level potential VDDP is supplied to the first pixel circuit 70a and the second pixel circuit 70b.

In the first pixel circuit 70a, the gates of the transistors T1a and T2a are connected to the clock line CLKa. The source of the transistor T1a is connected to the reset line RSTa, and the drain is connected to the anode of the photodiode D1a and the drain of the transistor T2a. The cathode of the photodiode D1a is connected to the gate of the transistor M1a. The drain of the transistor M1a is connected to the power supply line VDDa, and the source is connected to the output line OUTa. The capacitor C1a is provided between the gate of the transistor M1a and the readout line RWSa. The drain of the transistor T3a receives application of the potential VDDP, the gate is connected to the gate of the transistor M1a, and the source is connected to the source of the transistor T2a. In the first pixel circuit 70a, the node connected to the gate of the transistor M1a serves as a storage node, and the transistor M1a functions as a readout transistor. The second pixel circuit 70b has the same configuration as the first pixel circuit 70a.

The first and second pixel circuits 70a and 70b operate similarly to the first and second pixel circuits 60a and 60b of the sixth embodiment, with the exception of the following. The transistor T2a is turned off when the clock signal CLKa is at high level, and is turned on when the clock signal CLKa is at low level. The transistor T2b is turned off when the clock signal CLKb is at high level, and is turned on when the clock signal CLKb is at low level.

When the clock signal CLKa changes from high level to low level at the end of the first detection period, the transistor T2a changes from off to on. At that moment, the node connected to the anode of the photodiode D1a is charged with a potential corresponding to the gate potential Vinta of the transistor M1a via the transistors T2a and T3a. For this reason, when the first detection period ends, the current flowing through the photodiode D1a is immediately cut off.

Also, when the clock signal CLKb changes from high level to low level at the end of the second detection period, the transistor T2b changes from off to on. At that moment, the node connected to the anode of the photodiode D1b is charged with a potential corresponding to the gate potential Vintb of the transistor M1b via the transistors T2b and T3b. For this reason, when the second detection period ends, the current flowing through the photodiode D1b is immediately cut off.

As described above, the first pixel circuit 70a of the present embodiment is the first pixel circuit 60a of the sixth embodiment with the addition of the transistor T2a (first switching element) that has one end connected to the anode of the photodiode D1a (the terminal on the transistor T1a side) and is turned on/off in accordance with the clock signal CLKa, and the transistor T3a (second switching element) that applies a potential corresponding to the potential of the storage node to the source of the transistor T2a. The transistor T2a is turned on when the clock signal CLKa is at low level (when not in the detection period including the backlight lit period). The second pixel circuit 10b has a configuration similar to that of the first pixel circuit 10a, and the transistor T2a included in the second pixel circuit 70b is turned on when the clock signal CLKb is at low level (when not in the second detection period).

Similarly to the first and second pixel circuits 60a and 60b of the sixth embodiment, the first and second pixel circuits 70a and 70b enable detecting the light amount in the first detection period and the light amount in the second detection period. Also, when the clock signal CLKa changes, a potential corresponding to the potential of the storage node is applied to the terminal of the photodiode D1a on the side opposite from the storage node, thus enabling immediately cutting off the current flowing through the photodiode D1a and raising the detection precision. A similar effect is obtained with the second pixel circuit 70b as well.

VARIATIONS OF EMBODIMENTS

The embodiments of the present invention can have configurations according to the variations described below. FIGS. 23A to 23H are circuit diagrams of pixel circuits according to first to eighth variations of the first embodiment. First pixel circuits 11a to 18a shown in FIGS. 23A to 23H are obtained by making the following modifications to the first pixel circuit 10a of the first embodiment. Second pixel circuits 11b to 18b are obtained by making the same modifications to the second pixel circuit 10b of the first embodiment.

Figure 23A:
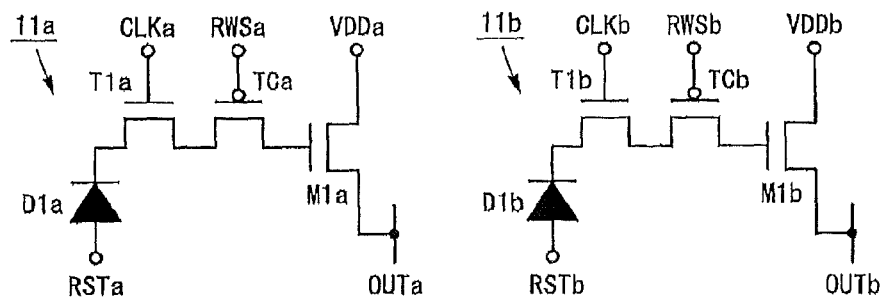
FIG. 23A is a circuit diagram of sensor pixel circuits according to a first variation of the first embodiment.

The first pixel circuit 11a shown in FIG. 23A is obtained by replacing the capacitor C1 included in the first pixel circuit 10a with a transistor TCa that is a P-type TFT. In the first pixel circuit 11a, the drain of the transistor TCa is connected to the drain of the transistor T1a, the source is connected to the gate of the transistor M1a, and the gate is connected to the readout line RWSa. When the readout high level is applied to the readout line RWSa, the transistor TCa connected in this way causes a greater change in the potential of the storage node than the original pixel circuit does. This enables amplifying the difference between the potential of the storage node when intense light was incident and the potential of the storage node when weak light was incident, thus improving the sensitivity of the pixel circuit 11a.

Figure 23B:
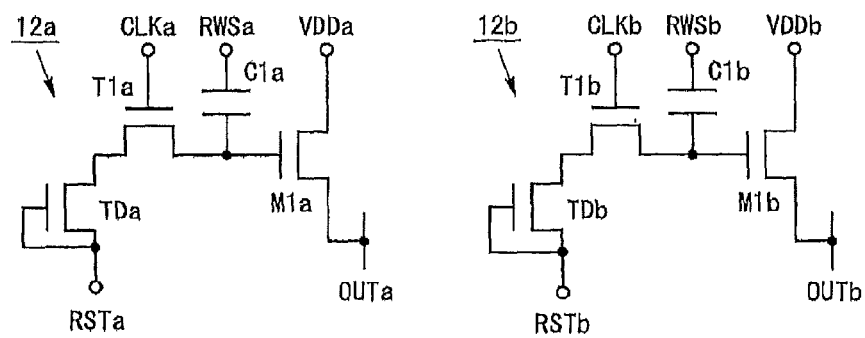
FIG. 23B is a circuit diagram of sensor pixel circuits according to a second variation of the first embodiment.

The first pixel circuit 12a shown in FIG. 23B is obtained by replacing the photodiode D1 included in the first pixel circuit 10a with a phototransistor TDa. Accordingly, all of the transistors included in the first pixel circuit 12a are N-type. This enables manufacturing the first pixel circuit 12a using a one-channel process in which only N-type transistors can be manufactured.

Figure 23C:
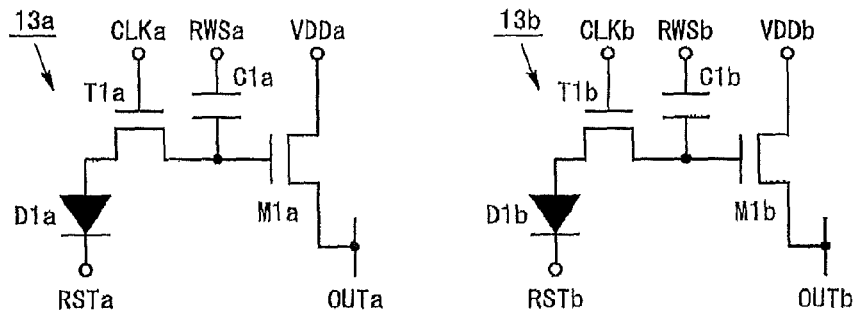
FIG. 23C is a circuit diagram of sensor pixel circuits according to a third variation of the first embodiment.

The first pixel circuit 13a shown in FIG. 23C is obtained by connecting the photodiode D1a included in the first pixel circuit 10a in an inverted manner. The first pixel circuit 13a is normally at high level, and receives a supply of the reset signal RSTa at the reset low level when resetting is performed. The cathode of the photodiode D1a is connected to the reset line RSTa, and the anode is connected to the drain of the transistor T1a. This obtains a variation of the pixel circuit.

Figure 23D:
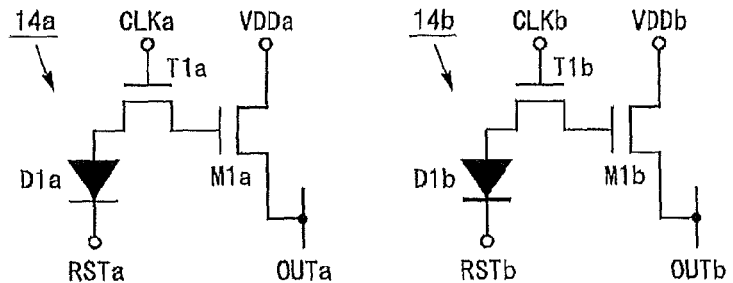
FIG. 23D is a circuit diagram of sensor pixel circuits according to a fourth variation of the first embodiment.

The first pixel circuit 14a shown in FIG. 23D is obtained by connecting the photodiode D1a included in the first pixel circuit 10a in an inverted manner and omitting the capacitor C1a. A reset signal RSTa similar to that in the first pixel circuit 13a is supplied to the first pixel circuit 14a. However, the reset signal RSTa is at the readout high level when readout is performed. When the reset signal RSTa rises to the readout high level, the potential of the storage node (the gate potential of the transistor M1a) rises, and a current corresponding to the potential of the storage node flows to the transistor M1a. In this way, the first pixel circuit 14a does not include the capacitor C1a. This enables increasing the aperture ratio by an amount corresponding to the capacitor C1a, thus improving the sensitivity of the pixel circuits.

Figure 23E:
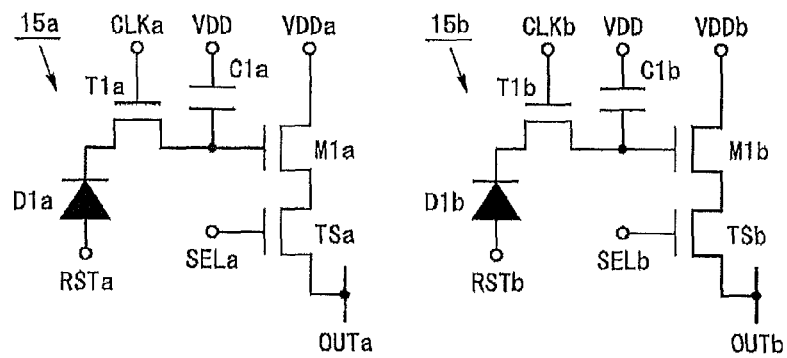
FIG. 23E is a circuit diagram of sensor pixel circuits according to a fifth variation of the first embodiment.

The first pixel circuit 15a shown in FIG. 23E is obtained by adding a transistor TSa to the first pixel circuit 10a. The transistor TSa is an N-type TFT and functions as a switching element for selection. In the first pixel circuit 15a, the source of the transistor M1a is connected to the drain of the transistor TSa. The source of the transistor TSa is connected to the output line OUTa, and the gate is connected to a selection line SELa. The selection signal SELa rises to high level when readout from the first pixel circuit 15a is performed. This obtains a variation of the pixel circuit.

Figure 23F:
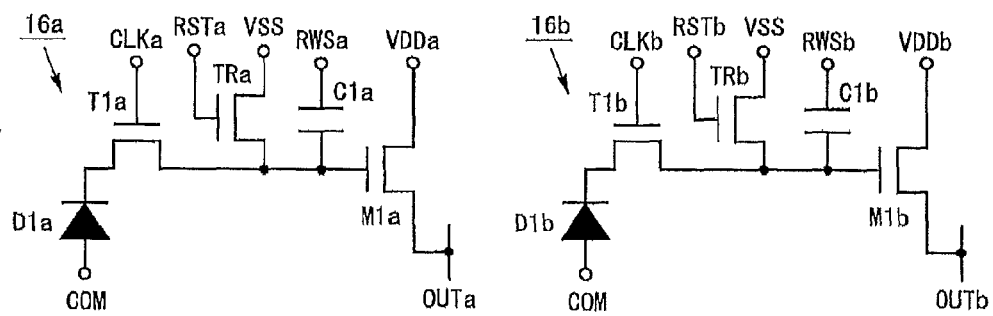
FIG. 23F is a circuit diagram of sensor pixel circuits according to a sixth variation of the first embodiment.

The first pixel circuit 16a shown in FIG. 23F is obtained by adding a transistor TRa to the first pixel circuit 10a. The transistor TRa is an N-type TFT and functions as a switching element for resetting. In the first pixel circuit 16a, the low level potential VSS is applied to the source of the transistor TRa, the drain is connected to the gate of the transistor M1a, and the gate is connected to the reset line RSTa. Also, a low level potential COM is applied to the anode of the photodiode D1a. This obtains a variation of the pixel circuit.

Figure 23G:
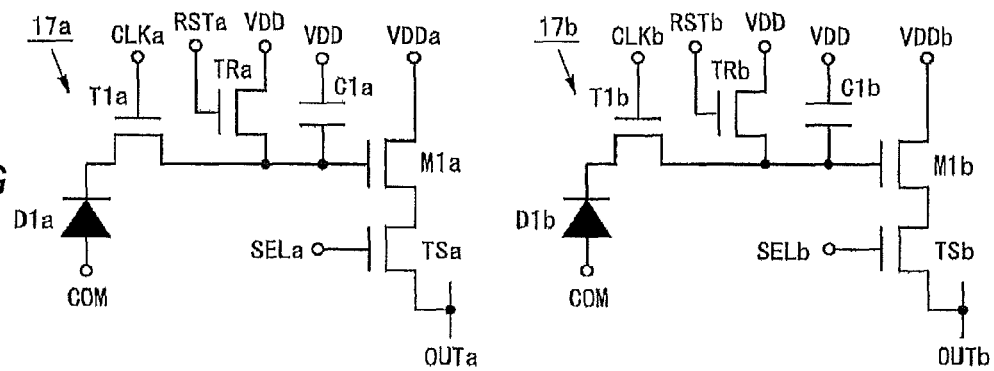
FIG. 23G is a circuit diagram of sensor pixel circuits according to a seventh variation of the first embodiment.

The first pixel circuit 17a shown in FIG. 23G is obtained by adding the transistors TSa and TRa to the first pixel circuit 10a. The connections of the transistors TSa and TRa are the same as those in the first pixel circuits 15a and 16a. This obtains a variation of the pixel circuit.

Figure 23H:
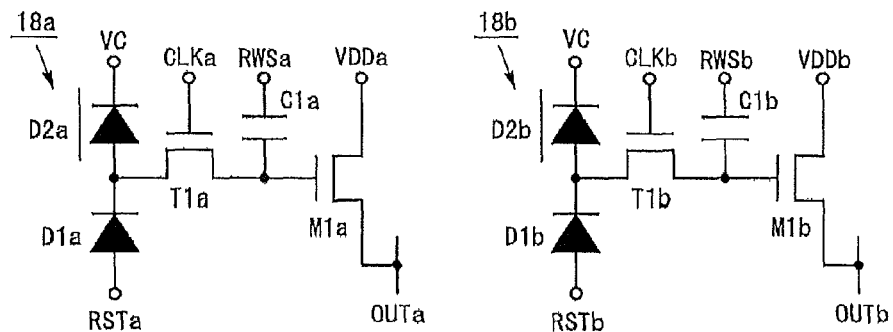
FIG. 23H is a circuit diagram of sensor pixel circuits according to an eighth variation of the first embodiment.

The first pixel circuit 18a shown in FIG. 23H is obtained by adding a photodiode D2a to the first pixel circuit 10a. The photodiode D2a is shielded from light and functions as a reference photosensor. The anode of the photodiode D2a is connected to the cathode of the photodiode D1a and the source of the transistor T1a, and the cathode receives application of a predetermined potential VC. The potential VC is a higher potential than the reset high level potential. Since a dark current flows in the photodiode D2a, it is possible to perform photodiode temperature compensation.

Similar modifications can also be made to the second to seventh embodiments. Also, various types of variations of the first to seventh embodiments can be realized through arbitrary combinations of the above-described modifications that do not run contrary to the respective natures thereof.

As described above, with the display devices of the above-described embodiments and variations thereof, a first sensor pixel circuit and a second sensor pixel circuit detect light in a specified detection period and hold the detected light amount when not in the specified detection period, and multiple first sensor pixel circuits and second sensor pixel circuits are arranged in the pixel region. In a frame in which input is performed by the sensor pixel circuits 9, the backlight is lit one time for a predetermined time in a frame period, and the first detection period and the second detection period are set one time each in the frame period. The first sensor pixel circuits are reset at the beginning of the detection period including a backlight lit period and detect light in that detection period. The second sensor pixel circuits are reset at the beginning of the second detection period and detect light in that detection period. Readout from the two types of sensor pixel circuits is performed in parallel in a line-sequential manner when not in the two types of detection periods. The difference circuit provided outside the sensor pixel circuits obtains the difference between the light amount in the first detection period and the light amount in the backlight extinguished period. This enables resolving conventional problems and providing an input function that is not dependent on the light environment.

Figure 24:
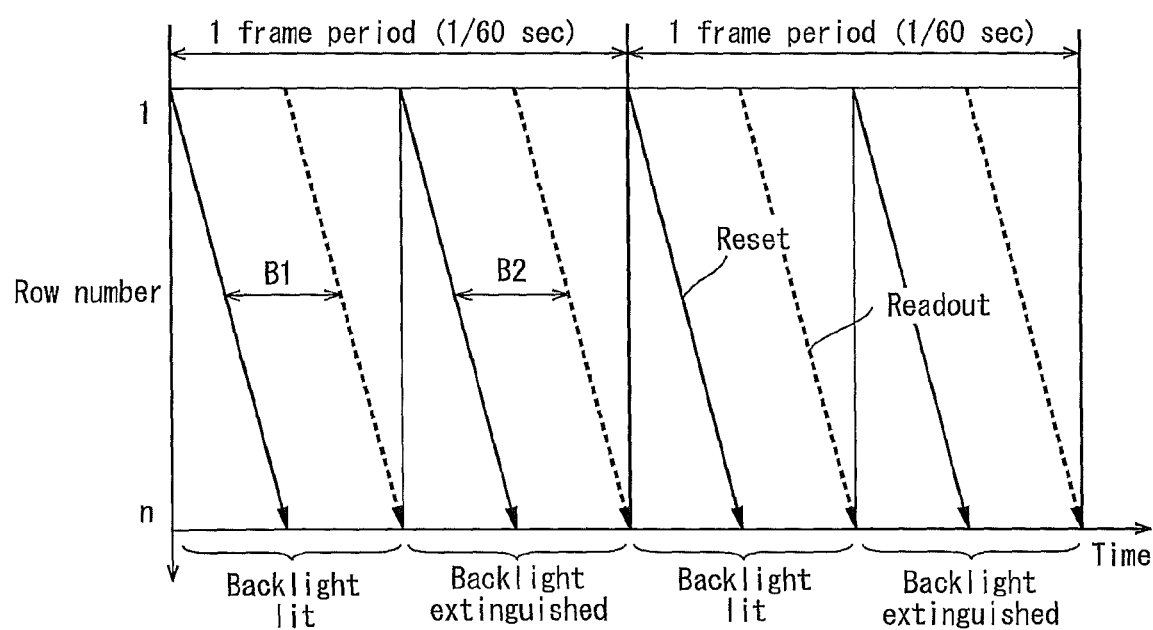
FIG. 24 is a diagram showing the timing of lighting and extinguishing of a backlight and the timing of resetting and readout with respect to photoreception elements in a conventional input/output device.
Figure 25:
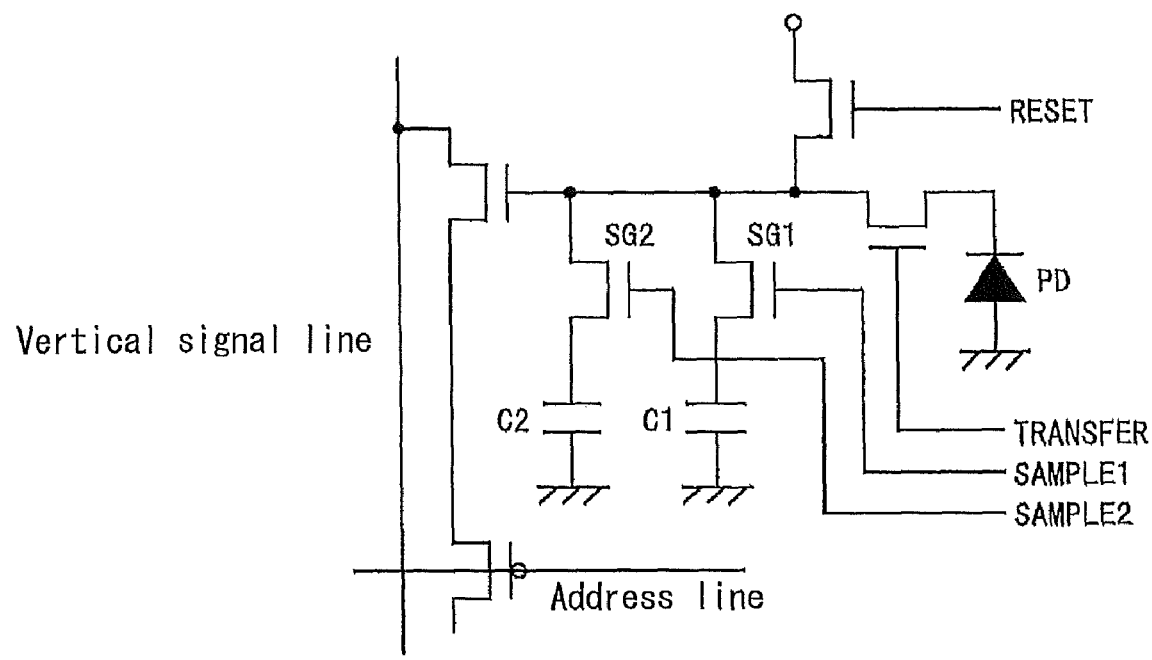
FIG. 25 is a circuit diagram of a unit photoreception portion included in a conventional solid-state imaging device.

Note that with the display devices according to the above-described embodiments and variations thereof, a configuration is described in which the first sensor pixel circuits, which are for detecting the light amount in the first detection period including a backlight lit period, and the second sensor pixel circuits, which are for detecting the light amount in the second detection period not including a backlight lit period, are provided separately, but a configuration is possible in which, as with the conventional configuration shown in FIG. 24 for example, a frame period is divided into a former half and a latter half, and a difference is obtained between light amounts that were detected by the same sensor pixel circuit in a backlight lit period and a backlight extinguished period. Specifically, a configuration is possible in which, in the former half of a frame period, the first detection period is provided, the light amount in the backlight lit period is obtained, and readout is performed in a line-sequential manner, thereafter resetting is performed, and then in the latter half of the same frame period, the second detection period is provided, the light amount in the backlight extinguished period is obtained, and readout is performed in a line-sequential manner. In this case as well, as described in the above-described embodiments, the linearity of sensor output can be improved by starting the lighting of the backlight during the first detection period.

Also, in the present invention, there are no particular limitations on the type of light source provided in the display device. Accordingly, for example, a visible-light backlight provided for display may be lit one time for a predetermined time in a frame period.

Also, a backlight for sensing may be lit multiple times for a predetermined time in a frame period. In this case, it is sufficient that the first detection period is set so as to span multiple periods in which the backlight is lit, and the second detection period is set outside the first detection period. In this case as well, it is preferable that the first detection period and the second detection period have the same length. Also, the second detection period may be set immediately after the detection period in the first detection period. This eliminates deviation between the two types of detection periods, thus enabling preventing the following characteristics with respect to motion input from fluctuating according to the input direction, and suppressing detection errors that occur due to light leakage in the switching elements included in the sensor pixel circuits.

Also, in the above embodiments, in a frame period, first the light amount is detected while the backlight for sensing is extinguished, and thereafter the backlight for sensing is lit and the light amount is detected (see FIG. 3). However, the present invention may be embodied as a variation in which, conversely, first the light amount is detected while the backlight for sensing is lit, and thereafter the light amount is detected while the backlight for sensing is extinguished. This variation has an advantage that light from the backlight for sensing is not incident on the TFTs while they are holding a charge.

INDUSTRIAL APPLICABILITY

The present invention is industrially applicable as a display device that includes a photosensor in a display region and can perform image pick-up and the like.

The invention claimed is:

1. A display device in which a plurality of photosensors are disposed in a display region, comprising:
a display panel including a plurality of display pixel circuits and a plurality of sensor pixel circuits;
a sensor signal processing circuit that processes output from the sensor pixel circuits;
a light source provided on a back face of the display panel;
a light shielding film provided between the sensor pixel circuits and the light source;
a light source control unit that provides a period in which the light source is lit and a period in which the light source is extinguished in one frame period in a case where input is performed by the photosensors;
a driving circuit that outputs, to the sensor pixel circuits, a first control signal that indicates a first detection period including the period in which the light source is lit and a second control signal that indicates a second detection period not including the period in which the light source is lit, and performs resetting and readout with respect to the sensor pixel circuits; and
a difference circuit that obtains a difference between output from the sensor pixel circuits that is based on charge stored in accordance with incident light in the first detection period and output from the sensor pixel circuits that is based on charge stored in accordance with incident light in the second detection period,
wherein the length of the first detection period and the length of the second detection period are equivalent, the light source is extinguished at the beginning of the first detection period, and the light source is lit at a time during the first detection period.

2. The display device according to claim 1,
wherein included among the sensor pixel circuits are a first sensor pixel circuit to which the first control signal is applied and a second sensor pixel circuit to which the second control signal is applied, and
the driving circuit performs readout from the first and second sensor pixel circuits in a line-sequential manner when in neither the first detection period nor the second detection period.

3. The display device according to claim 2,
wherein the light source is lit one time for a predetermined time in one frame period, and
the first detection period and the second detection period are set one time each in one frame period.

4. The display device according to claim 3,
wherein the driving circuit performs resetting of the first sensor pixel circuit at the beginning of the first detection period, and performs resetting of the second sensor pixel circuit at the beginning of the second detection period.

5. The display device according to claim 2,
wherein the display panel further includes a plurality of output lines that carry output signals of the first and second sensor pixel circuits,
the first and second sensor pixel circuits are connected to different output lines according to type, and
the driving circuit performs readout from the first and second sensor pixel circuits in parallel.

6. The display device according to claim 2,
wherein the first and second sensor pixel circuits each include:
one photosensor;
one storage node that stores charge corresponding to a detected light amount;
a readout transistor that has a control terminal capable of electrical connection to the storage node; and
a switching element for holding that is provided on a path of current that flows in the photosensor, and is turned on/off in accordance with a control signal that is applied, and
the switching element for holding included in the first sensor pixel circuit is turned on in the first detection period in accordance with the first control signal, and the switching element for holding included in the second sensor pixel circuit is turned on in the second detection period in accordance with the second control signal.

7. The display device according to claim 6,
wherein in the first and second sensor pixel circuits, the switching element for holding is provided between the storage node and one end of the photosensor, and
another end of the photosensor is connected to a reset line.

8. The display device according to claim 6,
wherein included in the first and second sensor pixel circuits as the switching element for holding are:
a first switching element for holding that is provided between the storage node and one end of the photosensor; and
a second switching element for holding that is provided between a reset line and another end of the photosensor.

9. The display device according to claim 7,
wherein one photosensor is shared between the two types of first and second sensor pixel circuits, and
one end of the shared photosensor is connected to one end of the switching element for holding included in each of the first and second sensor pixel circuits, and another end of the shared photosensor is connected to the reset line.

10. The display device according to claim 8,
wherein one photosensor is shared between the two types of first and second sensor pixel circuits, and
one end of the shared photosensor is connected to one end of the first switching element for holding included in each of the first and second sensor pixel circuits, and another end of the shared photosensor is connected to one end of the second switching element for holding included in each of the first and second sensor pixel circuits.

11. The display device according to claim 9,
wherein one readout transistor is shared between the two types of first and second sensor pixel circuits, and
the control terminal of the shared readout transistor is connected to one end of the shared photosensor and to one end of the switching element for holding included in each of the first and second sensor pixel circuits.

* * * * *